US010189567B2

(12) United States Patent
Chen et al.

(10) Patent No.: US 10,189,567 B2
(45) Date of Patent: Jan. 29, 2019

(54) IDENTIFYING CAMERA POSITION OF A UAV IN FLIGHT UTILIZING REAL TIME KINEMATIC SATELLITE NAVIGATION

(71) Applicant: Skycatch, Inc., San Francisco, CA (US)

(72) Inventors: David Chen, San Francisco, CA (US); Colleen Kelly Twitty, San Francisco, CA (US); Blaine Schanfeldt, San Francisco, CA (US); James J Johnson, Beaverton, OR (US); Jacob Federico, Santa Clara, CA (US)

(73) Assignee: SKYCATCH, INC., San Francisco, CA (US)

( * ) Notice: Subject to any disclaimer, the term of this patent is extended or adjusted under 35 U.S.C. 154(b) by 233 days.

(21) Appl. No.: 15/178,052

(22) Filed: Jun. 9, 2016

(65) Prior Publication Data

US 2017/0355458 A1      Dec. 14, 2017

(51) Int. Cl.
*B64C 39/02* (2006.01)
*G06K 9/00* (2006.01)
(Continued)

(52) U.S. Cl.
CPC ......... *B64C 39/024* (2013.01); *G05D 1/0094* (2013.01); *G05D 1/0858* (2013.01);
(Continued)

(58) Field of Classification Search
CPC ............ B64C 39/024; B64C 2201/024; B64C 2201/127; B64C 2201/145; G06K 9/0063; G05D 1/0094; G05D 1/0808
See application file for complete search history.

(56) References Cited

U.S. PATENT DOCUMENTS

| 7,418,320 B1* | 8/2008 | Bodin ................. G05D 1/0094 701/26 |
| 2007/0149209 A1* | 6/2007 | Lawrence ............... G01S 19/07 455/456.1 |

(Continued)

FOREIGN PATENT DOCUMENTS

| EP | 2728308 A2 | 5/2014 |
| JP | 5561843 B1 | 7/2014 |
| WO | WO 2017/213778 | 12/2017 |

OTHER PUBLICATIONS

International Search Report & Written Opinion as received in PCT/US2017/031323 dated Aug. 18, 2017.
(Continued)

*Primary Examiner* — Jelani A Smith
*Assistant Examiner* — Donald J Wallace
(74) *Attorney, Agent, or Firm* — Keller Jolley Preece

(57) ABSTRACT

Systems and methods are disclosed for determining a position of a camera affixed to a UAV in flight when the camera captures a digital aerial image. In particular, in one or more embodiments, the disclosed systems and methods utilize real time kinematic satellite navigation techniques to identify a position of a UAV. Moreover, the disclosed systems and methods precisely determine the time that a camera captures a digital aerial image together with an attitude of the UAV at the time of capture to calculate a location of a camera at the time of capture. In one or more embodiments, the disclosed systems and methods can utilize the determined position of the camera together with the captured digital aerial image to generate a three-dimensional representation of a site.

20 Claims, 12 Drawing Sheets

(51) Int. Cl.
*G05D 1/00* (2006.01)
*G05D 1/08* (2006.01)

(52) U.S. Cl.
CPC ...... *G06K 9/0063* (2013.01); *B64C 2201/024* (2013.01); *B64C 2201/127* (2013.01); *B64C 2201/145* (2013.01)

(56) References Cited

U.S. PATENT DOCUMENTS

| | | | |
|---|---|---|---|
| 2008/0050012 A1* | 2/2008 | Oyama | G06K 9/0063 382/154 |
| 2014/0119716 A1* | 5/2014 | Ohtomo | G01C 11/00 396/8 |
| 2014/0375493 A1 | 12/2014 | Weisenburger et al. | |
| 2015/0145954 A1 | 5/2015 | Pulleti et al. | |
| 2015/0170413 A1 | 6/2015 | Freund et al. | |
| 2016/0009390 A1 | 1/2016 | Kugelmass | |
| 2017/0113799 A1* | 4/2017 | Kovac | B64C 39/024 |
| 2017/0138733 A1* | 5/2017 | Michiels | G01C 11/025 |

OTHER PUBLICATIONS eBee RTK The survey-grade mapping drone: https://www.sensefly.com/drones/ebee-rtk.html.
A. Roze, J-C. Zufferey, A. Beyeler, A. McClellan; "eBee RTK Accuracy Assessment": https://www.sensefly.com/fileadmin/user_upload/sensefly/documents/eBee-RTK-Accuracy-Assessment.pdf.
αUAV Specifications: http://amuse-oneself.com/en/service/service01/spec.php.
αUAV Description and Features: http://amuse-oneself.com/en/service/service01/aos_uav.pdf.
RTKLIB: An Open Source Program Package for GNSS Positioning: http://www.rtklib.com.

* cited by examiner

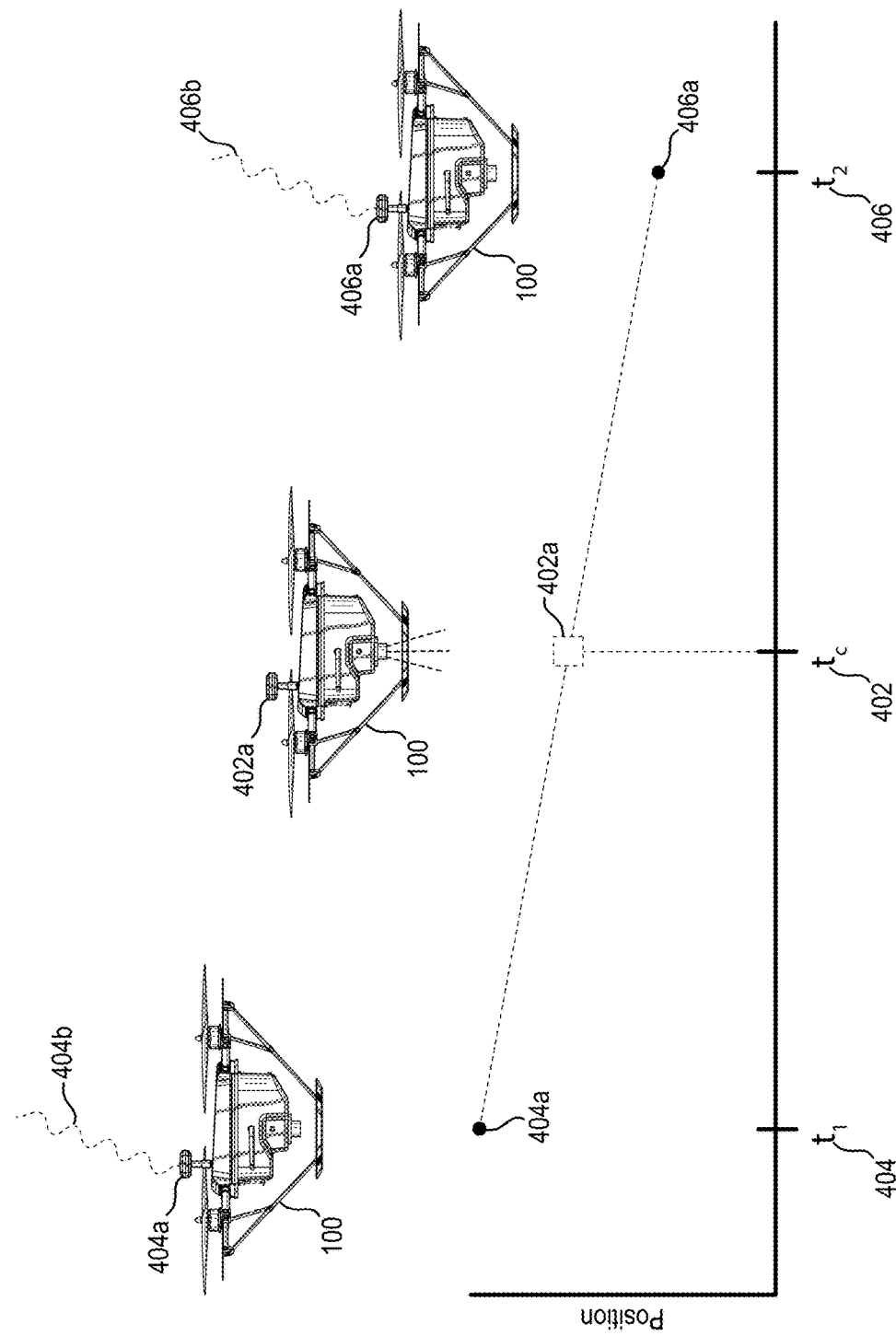

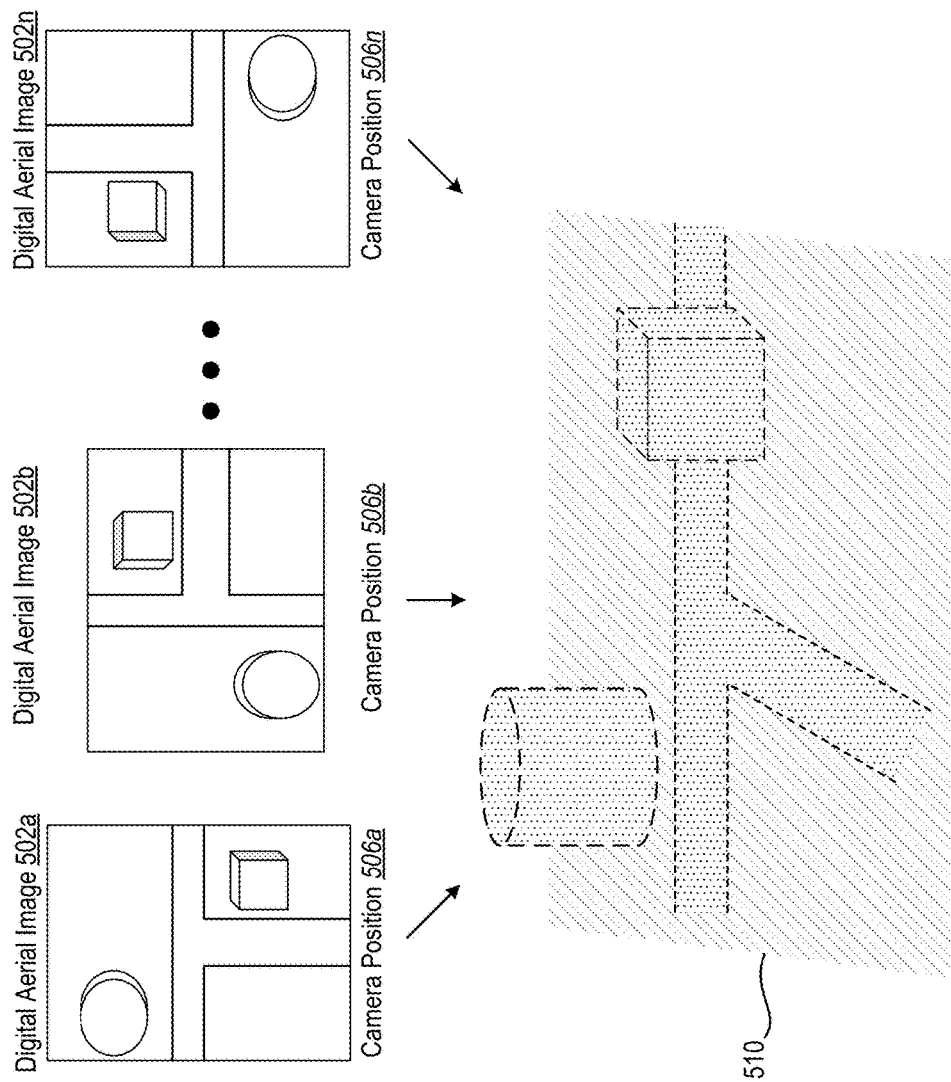

IDENTIFYING CAMERA POSITION OF A UAV IN FLIGHT UTILIZING REAL TIME KINEMATIC SATELLITE NAVIGATION

BACKGROUND

Individuals and businesses increasingly utilize UAVs to perform a variety of flight missions or tasks. Indeed, because of the reduced cost of UAVs relative to chartering manned aerial vehicles, businesses and individuals can engage in a variety of flight activities that were traditionally cost-prohibitive. For example, it is becoming increasingly common to utilize UAVs to perform flight missions for capturing digital aerial images of a site in construction, land management, mining, or other applications.

In particular, some conventional flight systems utilize UAVs to generate three-dimensional models of a site. For example, some conventional digital image systems capture a plurality of digital aerial images of a site with a plurality of survey ground control points and then generate a three-dimensional model utilizing the digital aerial images and the known location of the survey ground control points. In particular, such conventional systems utilize survey ground control points to precisely georeference the three-dimensional model.

Although such conventional flight systems allow users to utilize a UAV to generate three-dimensional models of a site, they also have a number of problems. For example, it is often time-consuming and expensive to place and/or identify known survey ground control points in relation to a site. Indeed, in implementations that repeatedly perform flight missions over a particular site, the amount of time and effort required to repeatedly place, measure, and maintain survey ground control points can significantly increase the cost of utilizing a UAV to capture digital aerial images and generate a three-dimensional model. Furthermore, placing, measuring, and maintaining survey ground control points introduces a significant risk of human error.

Rather than using ground control points, some conventional flight systems utilize GPS technology to identify the location of a UAV in taking digital aerial images. For example, some conventional flight systems analyze code embedded in a signal transmitted from a satellite to a UAV to determine the distance between the UAV and the satellite. Utilizing this approach, conventional flight systems can identify the position of the UAV (or approximate position of the camera affixed to the UAV), and then utilize the position of the UAV in combination with a digital aerial image to generate a three-dimensional model.

Although these conventional GPS flight systems can identify a location of a UAV, they also have their own problems. For example, conventional GPS flight systems are not very precise, and are only able to determine the location of a UAV (or camera) within a range of decimeters. This inaccuracy in the location of a UAV (or camera) directly translates into inaccuracies in any resulting three-dimensional model. Moreover, inaccuracies in the location of the UAV can increase the amount of computational resources required to generate an accurate three-dimensional model from a plurality of digital aerial images.

Accordingly, a number of problems and disadvantages exist with conventional systems for utilizing a UAV to capture digital aerial images and accurately generate three-dimensional models (e.g., by identifying accurate camera positioning data).

BRIEF SUMMARY

Embodiments of the present disclosure provide benefits and/or solve one or more of the foregoing or other problems in the art with systems and methods for identifying a precise location of a camera affixed to a UAV in flight. In particular, in one or more embodiments, the disclosed systems and methods utilize real time kinematic ("RTK") techniques to identify a precise position of a camera affixed to a UAV at a time when the camera captures a digital aerial image. For instance, in one or more embodiments, the disclosed systems and methods analyze a carrier signal transmitted from a number of satellites to identify a number of wave lengths between a GPS receiver of the UAV and each of the satellites. When the exact number of wavelengths has been solved, the disclosed systems and methods can determine the position of the GPS antenna within a tolerance of 2 cm. Moreover, in one or more embodiments, the disclosed systems and methods utilize RTK correction data from one or more reference stations to account for errors and inaccuracies and accurately determine a position of the UAV. Furthermore, the disclosed systems and methods can precisely measure the time that a camera affixed to the UAV captures a digital aerial image (e.g., by measuring the precise time when a shutter is open) to calculate the position of the camera affixed to the UAV at the time the camera captures the digital aerial image.

For example, in one or more embodiments, the disclosed systems and methods determine, during a flight mission of a UAV, a position of the UAV at a first time and a position of the UAV at a second time. In particular, the disclosed systems and methods determine the position of the UAV at the first time and the position of the UAV at the second time based on a number of wavelengths of a signal transmitted from a satellite to the UAV at the first time, a number of wave lengths of the signal at the second time, RTK correction data at the first time, and RTK correction data at the second time. Moreover, the disclosed systems and methods identify, during the flight mission, a time that a camera affixed to the UAV captures a digital aerial image of a site by detecting when a shutter of the camera affixed to the UAV is open. Moreover, the disclosed systems and methods detect an attitude (i.e., a measurement of pitch, roll, and yaw) of the UAV at the time that the camera affixed to the UAV captures the digital aerial image. The disclosed systems and methods then determine a position of the camera based on the time of capturing the digital aerial image, the attitude of the UAV at the time that the camera affixed to the UAV captures the digital aerial image, the position of the UAV at the first time, and the position of the UAV at the second time.

In this manner, the disclosed systems and methods can determine a location of a camera affixed to a UAV at the time a digital aerial image is captured with more precision than conventional digital flight systems. Indeed, in one or more embodiments, the disclosed systems and methods can determine a camera location corresponding to a time when a digital aerial image is captured within a tolerance of 2 centimeters horizontally and 2 centimeters vertically. The disclosed systems and methods can, thus, generate a more accurate three-dimensional model based on the camera location and the digital aerial image. Furthermore, because of the accuracy of the position of the camera, the disclosed systems and methods can reduce the amount of time and computational resources required to generate a three-dimensional model.

Additional features and advantages of exemplary embodiments of the present disclosure will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter. The foregoing summary is not an extensive overview, and it is not intended to identify key elements or indicate a scope. Rather the foregoing summary identifies aspects of embodiments as a prelude to the detailed description presented below.

BRIEF DESCRIPTION OF THE DRAWINGS

In order to describe the manner in which the above recited and other advantages and features of the invention can be obtained, a more particular description of the invention briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments of the invention and are not therefore to be considered to be limiting of its scope, the invention will be described and explained with additional specificity and detail through the use of the accompanying drawings in which:

FIG. 4A illustrates a representation of calculating a position of a UAV at a time that a camera captures a digital aerial image in accordance with one or more embodiments;

FIG. 5 illustrates a representation of generating a three-dimensional representation based on a plurality of digital aerial images and camera positions in accordance with one or more embodiments;

DETAILED DESCRIPTION

Figure 1:
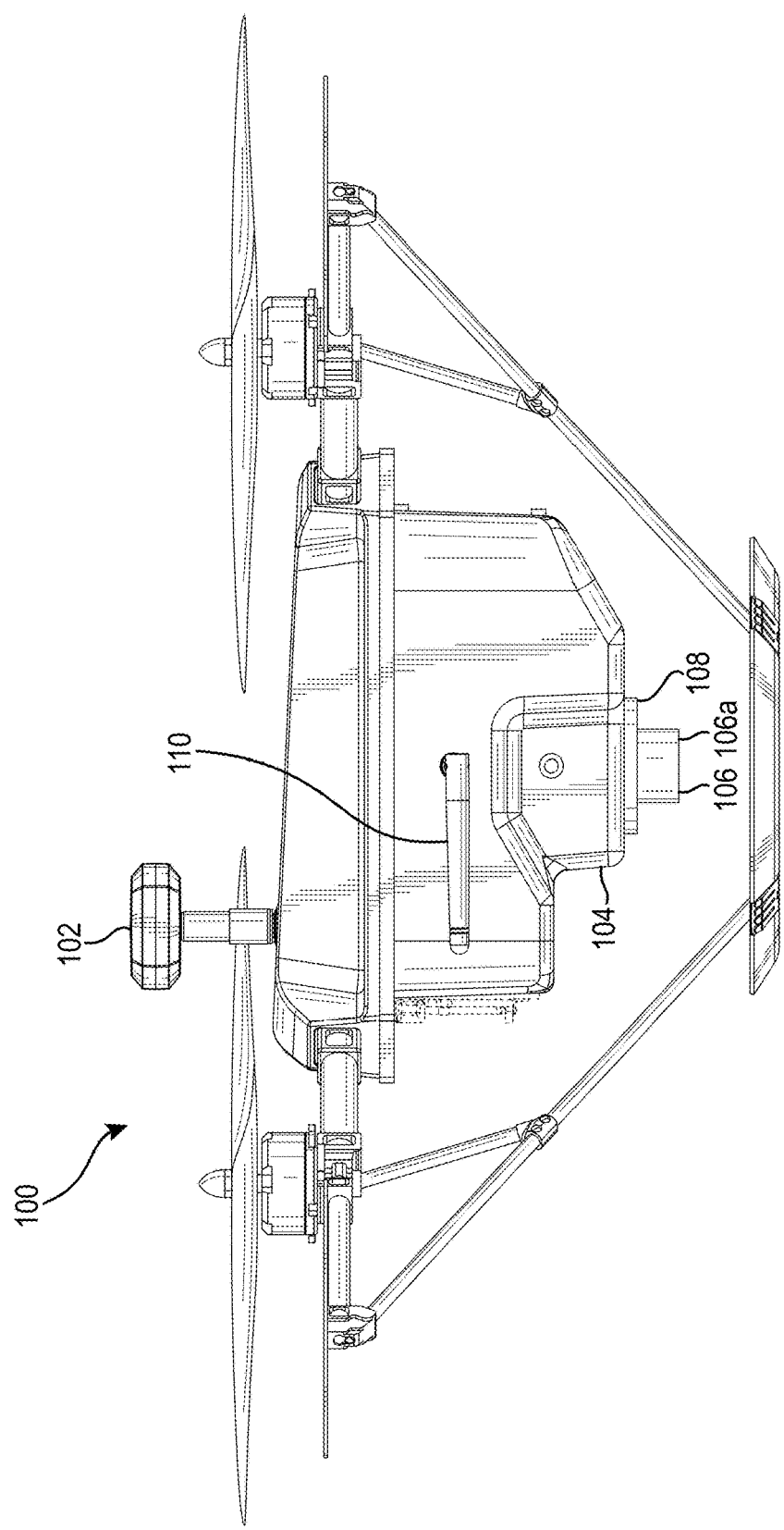
FIG. 1 illustrates a representation of a UAV with a signal receiver and camera in accordance with one or more embodiments.

The present disclosure includes various embodiments and features of a digital unmanned aerial vehicle ("UAV") position system and corresponding processes that assist in determining a precise position of a camera affixed to a UAV during a flight mission. In particular, in one or more embodiments the digital UAV position system determines a position of a camera affixed to a UAV at a time when the camera captures a digital aerial image. Specifically, in one or more embodiments, the digital UAV position system determines positions of a UAV based on the number of wavelengths in a carrier signal transmitted between a number of satellites and the UAV based on RTK correction data from one or more reference stations. Specifically, the digital UAV position system uses RTK data from the RTK reference station to solve for the integer number of wavelengths from the UAV's GPS antenna to each of the number of satellites. The digital UAV position system also determines precise times associated with the determined positions. Moreover, in one or more embodiments, the digital UAV position system measures a precise time that a camera affixed to a UAV captures a digital aerial image. Based on the determined positions of the UAV determined from the carrier signal and RTK correction data together with the time that the camera affixed to the UAV captures the digital aerial image, the digital UAV position system can determine the position of the camera affixed to the UAV at the time the camera captures the digital aerial image.

For example, in one or more embodiments, the digital UAV position system determines, during a flight mission of a UAV, a position of the UAV at a first time and a position of the UAV at a second time (e.g., two times based on a frequency of observed data from a GPS receiver). In particular, the digital UAV position system determines the position of the UAV at the first time and the second time based on a number of wavelengths of a signal transmitted from a satellite to the UAV at the first time, a number of wave lengths of the signal at the second time, RTK correction data at the first time, and RTK correction data at the second time. Moreover, the digital UAV position system identifies, during the flight mission, a time that a camera affixed to the UAV captures a digital aerial image of a site by detecting when a shutter of the camera affixed to the UAV is open. Moreover, the digital UAV position system detects an attitude (i.e., a measurement of pitch, roll, and yaw) of the UAV at the time that the camera affixed to the UAV captures the digital aerial image (e.g., to determine the position of the camera relative to a signal receiver, such as an antenna, of the UAV). The digital UAV position system then determines a position of the camera based on the time of capturing the digital aerial image, the attitude of the UAV at the time that the camera affixed to the UAV captures the digital aerial image, the position of the UAV at the first time, and the position of the UAV at the second time.

By calculating a position of a camera affixed to a UAV utilizing real time kinematic techniques in conjunction with a precise measurement of time for capturing a digital image, the digital UAV position system can increase the accuracy of resulting position data. Indeed, in one or more embodiments, the digital UAV position system can determine position during a flight mission to a tolerance within 2 cm vertically and 2 cm horizontally (even when the UAV is traveling at top speeds). For instance, a UAV can fly a flight mission at a speed of 10 m/s and capture a plurality of digital aerial images while traveling at that speed. The digital UAV position system can determine the precise position of the camera at each time that the camera captures each digital aerial image within a tolerance of 2 cm vertically and 2 cm horizontally. This is a significant improvement in accuracy and precision over conventional systems.

Given the improvement in accuracy in relation to position data, the digital UAV position system can also increase the accuracy of three-dimensional models based on digital aerial images. For example, in one or more embodiments, the digital UAV position system generates a three-dimensional representation of a site based on a plurality of digital aerial images of the site and corresponding position data reflecting the position of the camera at the time of capturing each of the plurality of digital aerial images. With position data accurate to within a few centimeters, the digital UAV position system can generate a significantly more precise three-dimensional representation of the site.

Moreover, the digital UAV position system can generate a precise three-dimensional representation without utilizing ground control points. Indeed, the digital UAV position system does not require placing, measuring, surveying, capturing, or managing ground control points at a site to generate a three-dimensional representation. Rather, by determining a precise location where a camera captures a digital aerial image, each digital aerial image can be utilized as an anchor point in generating an accurate three-dimensional model of a site.

Furthermore, increased accuracy in position data also leads to reduced time and computing resources required to generate a three-dimensional representation. Indeed, in one or more embodiments, the digital UAV position system utilizes a structure from motion algorithm and/or a bundle adjustment algorithm that generates a three-dimensional representation based on a known position of the camera capturing the digital aerial image. The digital UAV position system can generate the three-dimensional representation utilizing these algorithms more quickly and efficiently with more precise position data. Thus, whether calculated in real-time during a flight mission on board the UAV or via post-processing at a remote server, the digital UAV position system allows for faster and less processing power in calculating position data of a camera capturing digital aerial images.

As just mentioned, in one or more embodiments, the digital UAV position system calculates position data in real time during a flight mission of a UAV. For example, the digital UAV position system can obtain a feed of RTK correction data during a flight mission corresponding to a site (e.g., from a reference station at the site or a reference station network comprising a plurality of reference stations in the vicinity). Moreover, the digital UAV position system can utilize the RTK correction data together with a carrier signal received at the UAV to determine a position of the UAV during a flight mission.

Moreover, in one or more embodiments, the digital UAV position system utilizes the position data during a flight mission. For example, the digital UAV position system can determine a position of the UAV and utilize the position to precisely navigate the UAV to another location (e.g., a landing station or another portion of a site).

Similarly, the digital UAV position system can utilize the quality or accuracy of position calculations to further navigate a UAV in flight. For example, the digital UAV position system can determine whether it has a fixed (i.e., more accurate) calculation of the number of wavelengths in a signal transmitted from a satellite or whether it has a floating (i.e., less accurate) calculation of the number of wavelengths. The digital UAV position system can alter navigation of the UAV based on a determination of whether a calculation is fixed or floating (e.g., pause a flight mission until a calculation of the number of wave lengths is fixed).

As mentioned above, in one or more embodiments, the digital UAV position system determines a precise time that a camera affixed to the UAV captures a digital aerial image of a site. Indeed, rather than measure a time that a request for capturing a digital aerial image is sent to a camera (a process that can take up to a full second for the camera to process and complete), in one or more embodiments, the digital UAV position system detects when a shutter of a camera affixed to the UAV is actually open.

For example, in one or more embodiments, the digital UAV position system includes a light diode (or other light sensor) configured to detect a flash of camera affixed to a UAV. Because most cameras signal a flash only when a shutter is open, detecting the flash of a camera provides a precise measurement of when a a shutter is open and when a camera captures a digital aerial image. Similarly, in one or more embodiments, the digital UAV position system measures a signal from the camera indicating that the flash is open. For example, the digital UAV position system can tap into output pins within the camera that send a signal to the shutter (or flash). In this manner, the digital UAV position system can identify a precise time when the shutter of a camera is open and capturing a digital aerial image.

Moreover, as mentioned above, in one or more embodiments, the digital UAV position system identifies a position of the UAV at the time a camera captures a digital aerial image. In particular, the digital UAV position system can calculate a position of the UAV at the time a camera captures a digital aerial image based on a position of the UAV at a plurality of other points in time. Specifically, in one or more embodiments, the digital UAV position system calculates a position at particular time intervals (e.g., every 5 Hz based on a frequency of a signal from a satellite and/or availability of RTK correction data). Accordingly, the digital UAV position system can calculate a position at the time a camera captures a digital aerial image by interpolating from a position at a first time and a position at a second time.

Furthermore, in one or more embodiments, the digital UAV position system calculates a position of a camera based on a position of a UAV. For example, in one or more embodiments, the location of a signal receiver of a UAV is slightly different than the location of a camera of the UAV. Accordingly, in one or more embodiments, the digital UAV position system measures an attitude (i.e., roll, pitch, and/or yaw) of the UAV at the time the camera captures the digital aerial image. Moreover, the digital UAV position system utilizes the attitude to determine a distance vector between the signal receiver and the camera. Furthermore, the digital UAV position system calculates the position of the camera by applying the distance vector to the position of the signal receiver. In this manner, the digital UAV position system can calculate a precise in-flight position of a camera affixed to a UAV at the time the camera captures a digital aerial image.

As used herein, the term "UAV" or "unmanned aerial vehicle" refers to an aircraft that can be piloted autonomously or remotely by a control system. A UAV may include any type of unmanned aircraft, including a micro UAV, low altitude UAV, or high altitude UAV, whether autonomously or remotely piloted. Moreover, a UAV may include a multi-rotor UAV, single-rotor UAV, blimp UAV, or other types of UAVs. In one or more embodiments, a UAV comprises a camera and/or GPS receiver affixed to the UAV. Additional detail regarding components and capabilities of UAVs in accordance with one or more embodiments are provided in relation to exemplary embodiments described herein (see, e.g., FIG. 1).

As used herein, the term "signal" refers to an electromagnetic waveform. For instance, the term "signal" includes an electromagnetic waveform transmitted by a satellite. A signal can comprise a carrier signal. As used herein, the term "carrier signal" refers to a waveform that is modulated with an input signal. In particular, the term "carrier signal" includes a waveform transmitted by a satellite that is modulated with a signal to convey information. As described in further detail below, a signal (including a carrier signal) is transmitted having a wave length. In one or more embodiments, the digital UAV position system identifies a number of wave lengths in a signal between a UAV (e.g., a GPS receiver) and a satellite.

As used herein, the term "flight mission" refers to a flight by a UAV to perform one or more tasks. For example, the term "flight mission" includes a UAV flight for capturing digital aerial images of a site.

As used herein, the term "RTK correction data" refers to data reflecting a signal received by a first device utilized to calculate a position of a second device. In particular, the term "RTK correction data" includes data reflecting a signal received by a reference station utilized to calculate a position of a UAV receiving the signal. For example, RTK correction data includes information regarding a signal received from a reference station to a UAV that enables the UAV to calculate a number of wavelengths in the signal between the UAV and the satellite. As described in greater detail below, in one or more embodiments, RTK correction data enables the digital UAV position system to account for atmospheric inaccuracies (e.g., signal delay or distortion caused by the ionosphere and/or troposphere) or inaccuracies due to a satellite clock and ephemerides. RTK correction data can come in a variety of forms. For example, the RTK correction data can comprise raw data indicating a signal received by a reference station. Similarly, the RTK correction data can comprise processed data that indicates a correction to apply to a signal received at a UAV.

As used herein, the term "camera" refers to any device capable of capturing a digital image. For example, the term "camera" includes an image capturing device affixed to a UAV that can capture a digital aerial image.

As used herein, the term "attitude" refers to the position of a UAV about one or more axes and/or relative to a reference point. In particular, the term "attitude" includes an amount of rotation of a UAV relative to an x, y, and/or z reference axis. For example, the term "attitude" includes a measure of roll, pitch, and/or yaw of a UAV.

As used herein, the term "position" refers to a location of an object relative to a reference. For example, a position of a UAV includes an x, y, and/or z coordinate that describes the location of the UAV (and/or its components) in a Cartesian coordinate system. The position of an object can be measured, expressed, or described in relation to any reference, including any coordinate system. For example, the position of a camera can be expressed in terms of a radial coordinate system, a Cartesian coordinate system, or some other system.

As used herein, the term "three-dimensional representation" refers to any digital data depicting a three-dimensional object or site. The term three-dimensional representation includes a three-dimensional point cloud, a three-dimensional mesh, a three-dimensional surface, or any other representation derived from the observation of a point or landmark from a single or multiple views.

As used herein, the term "site" refers to a location on Earth. In particular, the term site includes a location on Earth that a user seeks to capture in one or more digital aerial images (and/or one or more three-dimensional models). The term site can include a construction site, a mining site, a property, a wilderness area, a disaster area, or other location.

Figure 2:
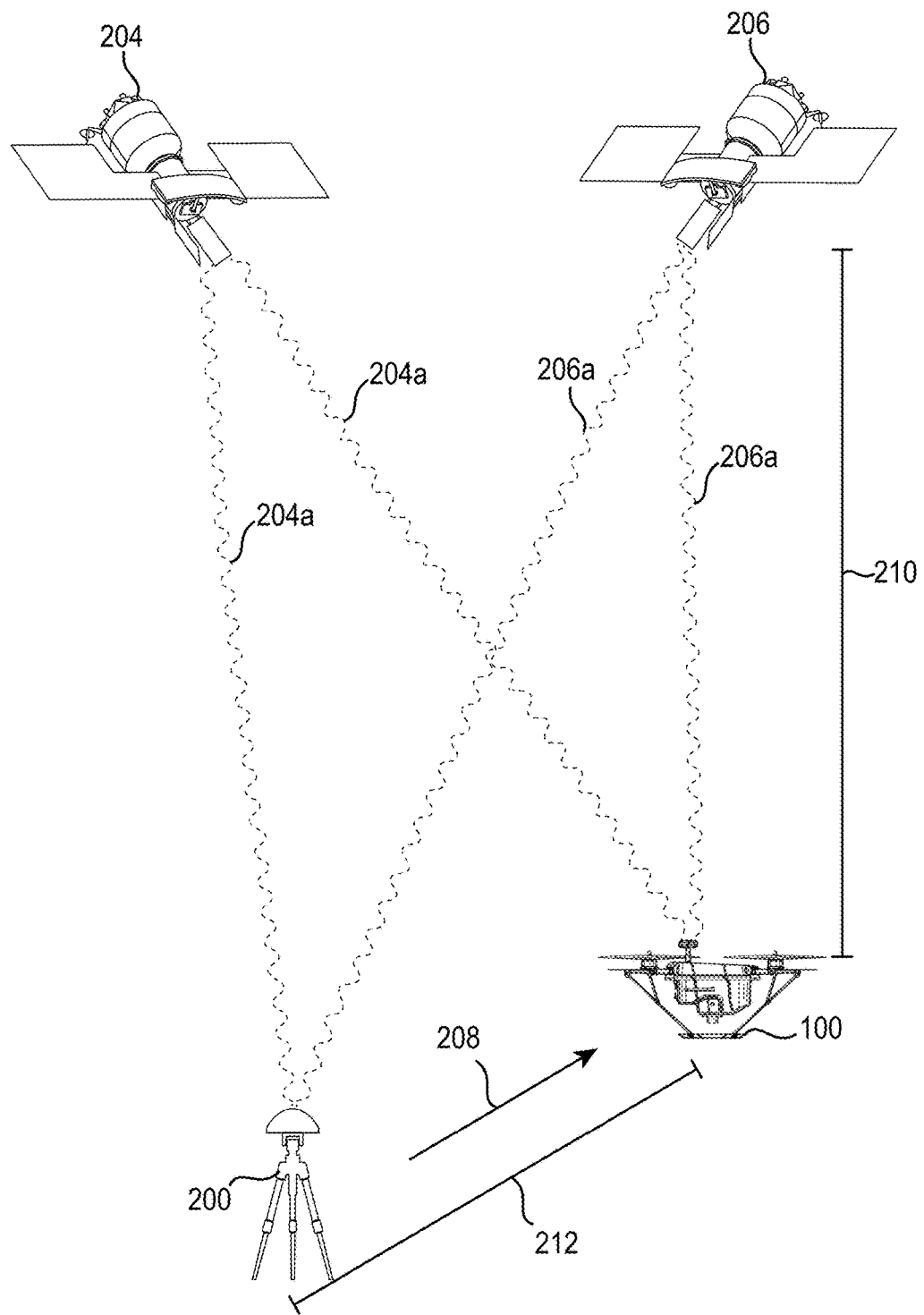
FIG. 2 illustrates a representation of satellites, a reference station, and a UAV in accordance with one or more embodiments.

Turning now to FIGS. 1-4C, additional details will be provided in relation to illustrative figures portraying exemplary embodiments of the digital UAV position system. In particular, FIG. 1 and its accompanying description disclose a UAV and corresponding components of the UAV utilized by the digital UAV position system in accordance with one or more embodiments. FIG. 2 and its accompanying description disclose additional detail regarding calculating a position of a UAV utilizing real-time kinematics in accordance with one or more embodiments. Moreover, FIG. 3 and its corresponding description provide additional disclosure regarding steps in a method of calculating a position of a camera affixed to a UAV in accordance with one or more embodiments. Furthermore, FIGS. 4A-4C and their corresponding disclosure illustrate additional detail regarding calculating a position of a UAV at a capture time based on the position of the UAV at other points in time.

As illustrated in FIG. 1, in one or more embodiments, the digital UAV position system utilizes a UAV 100 with a plurality of components. As shown, the UAV 100 is a multi-rotor vehicle, such as a quadcopter, and includes a carbon fiber shell, integrated electronics, a battery bay, and various additional sensors and/or receivers. Specifically, as shown, the UAV 100 includes a GPS receiver 102, a camera 104 (with a lens 106, a shutter 106a, and a flash 108), and an antenna 110.

Moreover, although not displayed in FIG. 1, the UAV 100 also includes a variety of other components. For example, the UAV 100 includes an onboard computer that controls the autonomous flight of the UAV 100. The UAV 100 also contains one or more computer-readable storage media and/or one or more processors with instructions stored thereon that, when executed by the one or more processors cause the UAV 100 to perform functions described herein.

As just mentioned, and as illustrated in FIG. 1, the UAV 100 includes a GPS receiver 102. The GPS receiver 102 can receive, identify, process, and obtain a GPS signal from a satellite (e.g., a GPS satellite). Although described in relation to GPS, it will be appreciated that the GPS receiver 102 can receive, identify, and/or analyze any type or variety of signal transmitted in relation to a global navigation satellite system, including GPS, GLONASS, Galileo, BeiDou, and/or GAGAN. Accordingly, the GPS receiver 102 can receive a carrier signal transmitted by a satellite that is part of any global navigation satellite system.

The GPS receiver 102 can receive one or more frequencies from one or more satellites in a global navigation satellite system. For example, the GPS receiver 102 can comprise a single frequency receiver, a dual frequency receiver, or another type of receiver. In particular, the GPS receiver 102 can receive L1, L2, and/or L5 frequencies transmitted by a satellite. Notably, based on the methods and processes described herein, the digital UAV position system can produce accurate position data with regard to a UAV, even utilizing a low cost, single frequency receiver.

As shown in FIG. 1, the UAV 100 also comprises the camera 104 with the lens 106, the shutter 106a, and the flash 108. The camera 104 can comprise any digital imaging device. In particular, the camera 104 can comprise any digital imaging device operable to capture digital aerial images.

As mentioned above, in one or more embodiments, the digital UAV position system measures when the lens 106 captures a digital aerial image. In particular, the digital UAV position system measures when the shutter 106a is open. In one or more embodiments, the digital UAV position system measures when the shutter 106a is open by utilizing a light sensor in conjunction with the flash 108. In particular, the flash 108 can comprise a light diode that measures light emitted from the flash. Because the camera 104 times the flash to correspond to the shutter 106a opening, measuring the flash can provide a very accurate measure of when the shutter 106a is open and the lens 106 is capturing a digital aerial image.

Similarly, in one or more embodiments, the digital UAV position system measures a time when the lens 106 captures a digital image by measuring a signal generated by the camera 104 to open the shutter 106a. In particular, in one or more embodiments, the camera 104 comprises output pins that transmit a signal to open the shutter 106a. In one or more embodiments, the digital UAV position system utilizes a sensor attached to the output pins to measure when the camera 104 transmits a signal to the shutter 106a to open (and/or close). In this manner, the digital UAV position system can measure a very precise pulse indicating when the camera 104 triggers the shutter 106a.

As illustrated, the UAV 100 also includes the antenna 110. The UAV 100 can utilize the antenna 110 to send and/or receive transmissions to and/or from a variety of devices, such as a flight control device, a reference station, or a computing device. Accordingly, the antenna 110 enables the UAV 100 to communicate with a variety of other devices. For example, the antenna 110 can receive UTK correction data from a flight control device and/or reference station. Moreover, the antenna 110 can transmit phase information regarding a carrier signal to a flight control device.

In one or more embodiments, the UAV 100 also comprises components for measuring an attitude of the UAV (over time or at a particular point in time). For example, the UAV 100 includes an inertial measurement unit that includes one or more gyroscopes that measure an attitude of the UAV. The inertial measurement unit can determine roll, pitch, and yaw of the UAV relative to a horizontal and vertical axes.

In addition, in one or more embodiments, the UAV 100 also comprises a flight controller clock. The flight controller clock can manage time in relation to a flight mission, capturing a digital aerial image, and/or determining positions of the UAV 100. Indeed, as mentioned, in one or more embodiments, time can be a critical component of accurately identifying a position of the UAV 100 and the camera 104 (e.g., the lens 106). For example, to calculate the position of the UAV 100, in one or more embodiments, the digital UAV position system compares (e.g., synchronizes over time) data regarding a carrier signal received at the UAV 100 with RTK correction data captured by a reference station. Accordingly, in one or more embodiments, the digital UAV position system synchronizes the flight controller clock of the UAV 100 with a GPS time transmitted from a satellite. Moreover, the digital UAV position system utilizes the flight controller clock to synchronize carrier signals received at the UAV 100 with RTK correction data captured by one or more reference stations. In this manner, the digital UAV position system can identify accurate time measurements in determining position, and accurately correlate the timing of positions with the timing of capture images.

As mentioned, in one or more embodiments, the digital UAV position system utilizes real time kinematic techniques to identify a position of a UAV. FIG. 2 illustrates identifying a position of UAV utilizing real time kinematic satellite navigation, in accordance with one or more embodiments. In particular, FIG. 2 illustrates the UAV 100, a reference station 200, a first satellite 204, and a second satellite 206.

The reference station 200 can comprise any device operable to receive a signal from a satellite. In particular, in one or more embodiments, the reference station 200 comprises a GPS receiver placed at a known location on Earth that can receive a carrier signal from a satellite. Moreover, in one or more embodiments, the reference station 200 also includes a transmitter that can send information regarding a received carrier signal, such as RTK correction data. For example, in one or more embodiments, the reference station 200 can transmit RTK correction data to the UAV 100 or to a remote server. In addition, the reference station 200 can also include a processor and computer readable storage medium operable to analyze information regarding the received carrier signal in generating RTK correction data.

In one or more embodiments, the reference station 200 is placed in the vicinity of the UAV 100 to produce more accurate position data. For example, in one or more embodiments the reference station 200 is placed near the site of a flight mission (e.g., within 10 km) to produce accurate position data.

The first satellite 204 and the second satellite 206 comprise satellites transmitting signals to Earth (e.g., carrier signals for navigation or determining the position of an object on Earth). For example, the satellites 204, 206 can comprise satellites orbiting the Earth as part of a global navigation satellite system. The satellites 204, 206 can transmit a variety of signals, including carrier signals transmitting pseudorandom noise codes, time, and/or ephemerides (i.e., parameters that define a satellite's orbit). For example, as illustrated in FIG. 2, the first satellite 204 transmits a carrier signal 204a that is received by both the UAV 100 and the reference station 200. Similarly, the second satellite 206 transmits a carrier signal 206a that is received by both the UAV 100 and the reference station 200. Although FIG. 2 illustrates two satellites 204, 206, it will be appreciated that the digital UAV position system can utilize additional satellites (e.g., five satellites transmitting five signals).

As mentioned briefly above, real time kinematics is a technique that generates precise position data. In particular, the technique is based on measurements of a carrier signal by a rover device (e.g., a UAV) and RTK correction data from one or more reference stations (i.e., reference stations with a known location). Specifically, the technique determines a position of the rover device (e.g., the UAV) by determining the number of wave lengths in a carrier signal between the satellite and the rover device (e.g., multiplying the number of wave lengths by the the wave length to calculate a distance to the satellite). The technique utilizes the RTK correction data to account for errors and inaccuracies that result from a single measurement of the carrier signal.

For example, the atmosphere can alter a transmission of a signal from a satellite and thus produce inaccurate position measurements. Similarly, a satellite clock can have inaccuracies that can impact the precision of resulting position measurements. The real time kinematic technique utilized by one or more embodiments of the digital UAV position system adjusts for these errors based on the carrier signal measured by a UAV and the RTK correction data obtained from one or more reference stations. In particular, by comparing carrier signals received by a UAV and a reference station (i.e., RTK correction data), the digital UAV position system can account for errors introduced by ionospheric or tropospheric delay as well as satellite clock inaccuracies.

Moreover, based on the carrier signal information received at the UAV and the RTK correction data from the one or more reference stations, the digital UAV position system can resolve a position of the UAV (e.g., a position of the UAV relative to a known position of one or more reference stations). For example, based on the carrier signal received at the UAV and the RTK correction data, the digital UAV position system can resolve the number of wave lengths between the UAV and the satellite, the number of wave lengths between the reference station and the satellite, and/or the relative position of the UAV to the known position of the reference station. The digital UAV position system can utilize this information to calculate a position of the UAV.

For example, as shown in FIG. 2, the first satellite 204 emits a carrier signal 204a that is received by the UAV 100 and the reference station 200. Moreover, the second satellite 206 emits a carrier signal 206a that is received by the UAV 100 and the reference station 200. In response to receiving the carrier signals 204a, 206a, the reference station 200 can generate and transmit RTK correction data. In particular, as shown in FIG. 2, the reference station sends RTK correction data 208 to the UAV 100.

The digital UAV position system can utilize the RTK correction data 208 to identify the position of the UAV 100. In particular, in one or more embodiments, the UAV 100 compares the carrier signals 204a, 206a received at the UAV with the RTK correction data 208 received from the reference station 200 and calculates a number of wave lengths 210 between the UAV and the satellite 206. Furthermore, in one or more embodiments, the UAV 100, based on the number of wave lengths 210, calculates a relative position 212 between the known location of the reference station 200 and the UAV 100. This process of identifying an integer number of wavelengths is referred to as ambiguity resolution or resolving integer ambiguity.

More particularly, in one or more embodiments, the digital UAV position system utilizes one or more algorithms to calculate a position of a UAV based on a carrier signal received by a UAV and RTK correction data. Specifically, in one or more embodiments, the digital UAV position system utilizes the set of algorithms identified as the RTKLIB Open Source Program Package For GNSS Positioning for generating UAV position data based on a carrier signal from a UAV and RTK correction data from one or more remote stations.

It will be appreciated that although FIG. 2 illustrates a single reference station 200, in one or more embodiments, the digital UAV position system utilizes a real time kinematic network. In particular, the digital UAV position system can utilize a real time kinematic network ("RTK network") comprising a plurality of reference stations that receive signals from a plurality of satellites (and transmit RTK correction data for use in calculating a position of the UAV). For example, an RTK network can comprise a plurality of reference stations (e.g., permanent stations) in communication with a central processing station (e.g., a remote server). Based on information regarding carrier signals provided by the plurality of reference stations, the central processing station can calculate and transmit RTK correction data specific to a particular location identified by a user. In one or more embodiments, the digital UAV position system utilizes an RTK network, thus avoiding the need for a reference station on site and/or the need to set up a reference station for a particular flight mission.

Moreover, although not illustrated in relation to FIG. 2, it will be appreciated that in one or more embodiments, the digital UAV position system can synchronize time between or among the satellites 204, 206, the reference station 200, and the UAV 100. Indeed, in one or more embodiments, the flight controller comprises a real time operating system that can guarantee precise timing to microseconds. For instance, as mentioned above, the UAV 100 can comprise a flight controller clock that synchronizes with times tracked by each of the satellites 204, 206. For example, the UAV 100 can synchronize the flight controller clock to periodic time transmissions embedded in the carrier signals 204a, 206a. Similarly, the reference station can synchronize RTK correction data with times transmitted by each of the satellites 204, 206. In this manner, the digital UAV position system can align RTK correction data with information regarding a carrier signal received by a UAV to more accurately calculate a precise position of the UAV.

It will be appreciated that the digital UAV position system can calculate a position of the UAV 100 in real-time during a flight mission or via post-processing after a flight mission. Identifying a position of the UAV 100 in real-time during a flight mission allows the digital UAV position system to assist the UAV 100 in flight.

For example, in one or more embodiments, the UAV 100 (or a flight control device associated with the UAV 100) calculates a position of the UAV 100 during flight, allowing the UAV to utilize a calculated position to generate a three-dimensional representation of a site during a flight mission of the site. Moreover, the digital UAV position system can enable the UAV 100 to utilize the calculated position and/or the three-dimensional representation for navigation. For example, the UAV 100 can calculated its position during a flight mission and generate a three-dimensional representation, the UAV 100 can utilize the three-dimensional representation to identify a location of a landing station (or some other location on the site), and the UAV 100 can utilize the location of the landing station and the location of the UAV 100 to more accurately navigate to the landing station (or some other location).

Similarly, in one or more embodiments, the digital UAV position system can utilize real-time position calculations to identify a variation in the quality of position calculations in relation to a flight mission. Indeed, although the digital UAV position system can calculate a position of a UAV, in one or more embodiments, the quality of a position calculation can vary over time. For example, it can take time to resolve calculations to fix an integer number of wave lengths (e.g., an integer number of wave lengths between a UAV and a satellite). The digital UAV position system attempts to resolve this issue of integer ambiguity (via ambiguity resolution). However, the UAV position system may be unable to identify a fixed number of integer wavelengths at all times. Accordingly, in one or more embodiments, the digital UAV position system utilizes a float approach (rather than a fixed calculation of the number of integers) to estimate a position (e.g., when the digital UAV position system is unable or waiting to identify a fixed calculation). The float approach, however, tends to lead to less accurate results (e.g., within decimeter level accuracy). Accordingly, in one or more embodiments, the digital UAV position system can detect whether a position calculation is based on a fixed calculation or a floating calculation.

Moreover, the digital UAV position system can modify navigation of a UAV based on the quality of a position calculation. In particular, upon detecting that a fixed calculation of wave lengths is not available (e.g., only a float calculation is available), the digital UAV position system can delay a flight mission (e.g., stop a UAV in flight or delay the beginning a flight mission). In addition, upon detecting a fixed calculation, the digital UAV position system can proceed with a flight mission (e.g., begin or continue a flight mission).

Figure 3:
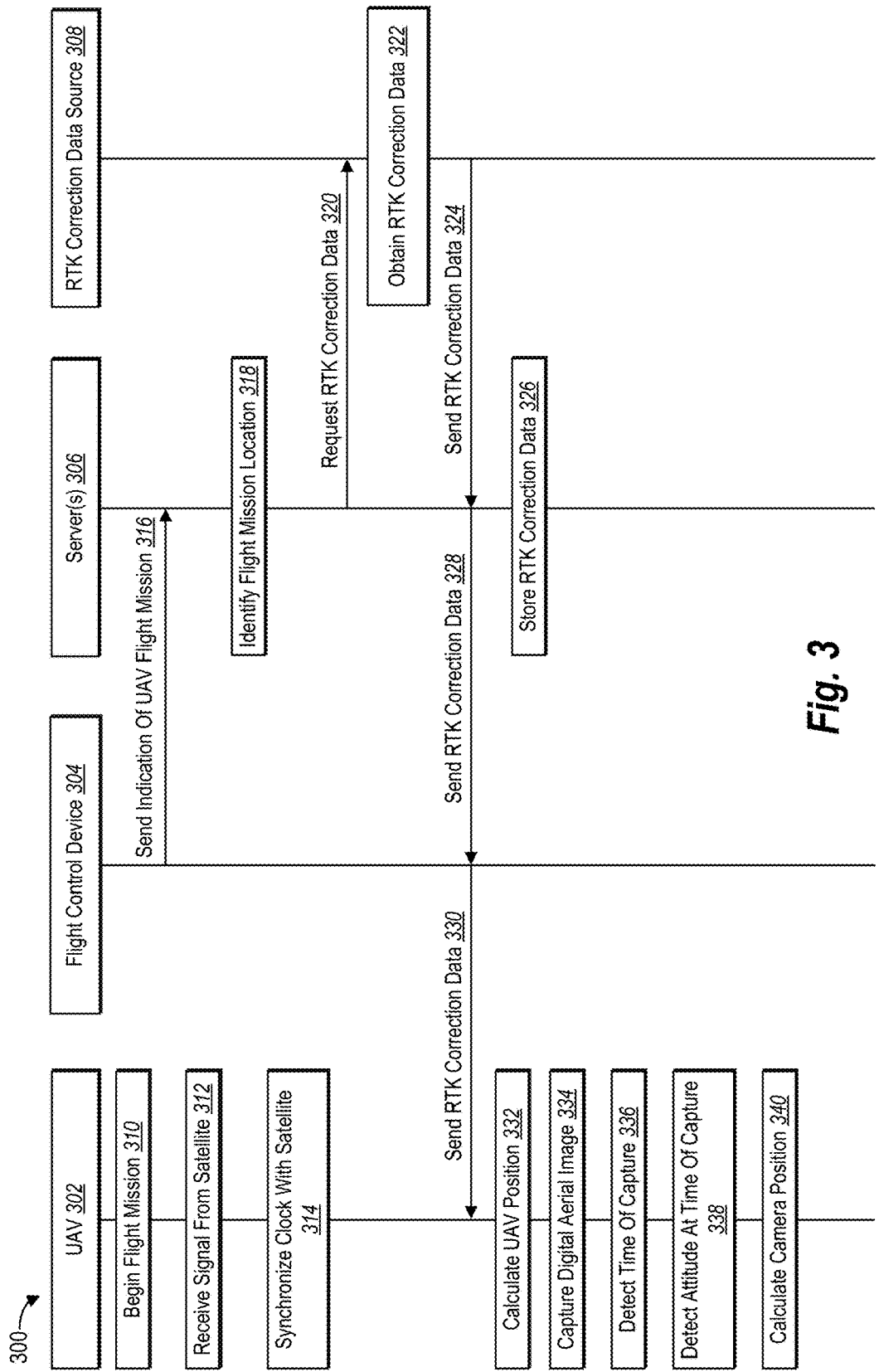
FIG. 3 illustrates a schematic diagram comprising a plurality of steps in a method of determining the position of a camera affixed to a UAV in accordance with one or more embodiments.

Turning now to FIG. 3, additional detail will be provided regarding a method of calculating a position of a camera affixed to a UAV in accordance with one or more embodiments of the digital UAV position system. In particular, FIG. 3 illustrates a method 300 comprising a plurality of steps 310-340 performed by a UAV 302 (e.g., the UAV 100), a flight control device 304, server(s) 306, and/or an RTK correction data source 308. The methods described in relation to FIG. 3 may be performed with less or more steps/acts or the steps/acts may be performed in differing orders or by different devices. For example, steps illustrated in relation to FIG. 3 as being performed by the UAV 302 can be performed by the flight control device 304 or the server(s) 306. Additionally, the steps/acts described may be repeated or performed in parallel with one another or in parallel with different instances of the same or similar steps/acts.

As illustrated, the digital UAV position system can utilize the flight control device 304 to perform one or more steps in the method 300. The flight control device 304 can comprise any device operable to communicate with and/or modify flight of the UAV 302. For example, the flight control device 304 can comprise a computing device (e.g., tablet, smartphone, or laptop) utilized by a remote pilot to navigate the UAV. In particular, the flight control device 304 can comprise a computing device utilized by a remote pilot to start the UAV 302, fly the UAV 302, land the UAV 302, or transmit information to the UAV 302.

In addition, as shown in FIG. 3, the digital UAV position system can utilize the server(s) 306 to perform steps in the method 300. The server(s) 306 comprise one or more devices that can generate, store, receive, and/or transmit data. For example, the server(s) 306 can comprise a remote data server, a remote communication server, and/or a remote web-hosting server.

Moreover, the digital UAV position system can utilize the RTK correction data source 308 to perform steps in the method 300. The RTK correction data source 308 can comprise one or more reference stations and/or processing stations. For example, the RTK correction data source 308 can comprise a reference station set up at or near a site of a flight mission (e.g., within 10 km). Similarly, the RTK correction data source 308 can comprise an RTK real time kinematic network comprising a plurality of permanent reference stations in communication with a central processing station.

As shown in FIG. 3, the method 300 includes the step 310 of beginning a flight mission. The step 310 can comprise a UAV arriving at a site, setting up a UAV at a site, initiating flight systems or guidance systems of the UAV, starting a motor and/or rotors of a UAV, launching a UAV off from the ground, or capturing a digital aerial image utilizing a camera affixed to the UAV.

Moreover, upon beginning the flight mission, the UAV 302 can also perform the step 312 of receiving a signal from a satellite. Indeed, as mentioned above, the UAV 302 can receive a carrier signal transmitted by an orbital satellite. Moreover, in one or more embodiments, the UAV 302 performs the step 314 of synchronizing a clock with a satellite. In particular, as mentioned, the UAV 302 can synchronize a flight controller clock with a time transmission signal from a satellite.

Upon beginning a flight mission, the flight control device 304 can perform the step 316 of sending an indication of a UAV flight mission to the server(s) 306. For example, the UAV 302 can send an indication that it is beginning the flight mission to the flight control device 304 and the flight control device 304 can send an indication that the UAV has begun the flight mission to the server(s) 306.

As illustrated, upon receiving an indication of a UAV flight mission from the flight control device 304, the server(s) 306 can perform the step 318 of identifying a flight mission location. For example, the server(s) 306 can identify the flight mission location based on information contained in the indication (of step 316) from the flight control device 304. Similarly, the server(s) 306 can detect a location of the UAV 302 and/or the flight control device 304 (e.g., via a geo-location device located on the UAV 302 and/or the flight control device 304).

Upon identifying the flight mission location, the server(s) 306 can perform the step 320 of sending a request for RTK correction data to the RTK correction data source. For example, the step 320 can comprise sending a request to a remote server (e.g., a central processing station). In particular, the request for RTK correction data can include an indication of the identified location of the flight mission (i.e., from step 318).

The step 320 of requesting RTK correction data can also comprise communicating directly with one or more reference stations. For example, the step 320 can comprise establishing communication with a reference station at a site of a flight mission and sending a request for RTK correction data to the reference station.

As shown in FIG. 3, upon receiving a request for RTK correction data, the RTK correction data source 308 can perform the step 322 of obtaining RTK correction data. For example, the step 322 can comprise a central processing station accessing and analyzing data from a plurality of reference stations and generating RTK correction data corresponding to the identified location of the flight mission (e.g., the location identified at step 318 and sent at step 320). Similarly, the step 322 can comprise a reference station measuring a carrier signal from a satellite and generating RTK correction data.

Upon obtaining RTK correction data, as shown in FIG. 3, the RTK correction data source 308 can perform the step 324 of sending RTK correction data to the server(s) 306. Upon receiving the RTK correction data, in one or more embodiments, the server(s) 306 perform the step 326 of storing the RTK correction data. Thus, for example, the server(s) can maintain RTK correction data for post-processing, error correction at a later time, or as a redundancy to lost or corrupted RTK correction data.

Moreover, the server(s) 306 can perform the step 328 of sending the RTK correction data to the flight control device 304. Moreover, the flight control device 304 can perform the step 330 of sending the RTK correction data to the UAV 302.

In one or more embodiments, the RTK correction data source 308, the server(s) 306, and/or the flight control device 304 repeatedly (and/or continuously) perform the steps 324-330. Indeed, in one or more embodiments, the RTK correction data source 308, the server(s) 306, and/or the flight control device 304 provide the UAV 302 with a stream of RTK correction data for utilization in calculation position data during a flight mission.

Upon receiving RTK correction data (or a stream of RTK correction data), as shown in FIG. 3, the UAV 302 can perform the step 332 of calculating a UAV position. In particular, as described, the UAV 302 can utilize the RTK correction data together with the signal received from the satellite, to identify a position of the UAV at one or more points in time. More specifically, the UAV 302 can utilize the RTK correction data (from step 330) and the carrier signal (from step 312) to determine a position of the UAV based on the number of wavelengths in the carrier signal between the UAV 302 and the satellite.

Moreover, in one or more embodiments, the UAV 302 repeatedly performs the step 332. For example, in one or more embodiments, the UAV 302 determines a position of the UAV 302 at regular intervals (e.g., every 5 hertz or 10 hertz based on the availability of information regarding the carrier signal, output of the GPS receiver, and/or availability of RTK correction data). Accordingly, the step 332 of calculating the UAV position can occur repeatedly, and at various times, throughout a flight mission (or repeatedly for various times after a flight mission).

The step 332 can also include determining a quality of a position calculation. For example, as described above, the UAV 302 can determine that a calculation results in a fixed number of integer wave lengths. Similarly, the UAV 302 can identify a floating calculation. As discussed above, based on the determination that a calculation is floating or fixed, the UAV 302 can modify navigation (e.g., delay a flight mission until the calculation is fixed).

In addition, as shown in FIG. 3, the UAV 302 can also perform the step 334 of capturing a digital aerial image (e.g., utilizing a digital camera affixed to the UAV 302). Moreover, the UAV 302 can perform the step 336 of detecting a time of capture. Specifically, the UAV 302 can detect the time that a digital camera affixed to the UAV captures a digital aerial image (e.g., when a shutter of the camera is open). As mentioned previously, the UAV 302 can detect that time that a digital camera affixed to the UAV 302 captures a digital aerial image by utilizing a light sensor operatively connected to a flash of a digital camera so as to detect when the flash is engaged (and when a camera shutter is open). Similarly, the UAV 302 can access one or more output pins of a camera affixed to the UAV 302 to detect a signal from the camera indicating the camera shutter.

Moreover, the UAV 302 can also perform the step 338 of detecting an attitude of the UAV 302 at the time of capture. In particular, the UAV 302 can detect a roll, pitch, and yaw of the UAV 302 at the time a camera affixed to the UAV 302 captures a digital aerial image. The step 338 can also include calculating a distance vector between a GPS receiver of the UAV 302 and the camera of the UAV based on the detected attitude. Indeed, in one or more embodiments, the camera and GPS receiver are located in different positions on the UAV 302; accordingly, the relative position of the camera and GPS receiver can change with the attitude of the UAV 302. Accordingly, to increase the precision of position data, the UAV 302 can calculate a distance vector between the GPS receiver and the camera at the time the camera captures a digital aerial image.

Furthermore, the UAV 302 can also perform the step 340 of calculating a camera position. For instance, the UAV 302 can utilize the calculated UAV positions (from step 332) and the time of capture (from step 336) to determine a position of the UAV at the time of capture. Specifically, in one or more embodiments, the UAV 302 interpolates between the position the calculated positions of the UAV to identify a position of the UAV at the time of capture.

Moreover, the UAV 302 can utilize the attitude of the UAV 302 at the time of capture (e.g., the distance vector from step 338) to determine a position of the camera relative to a position of the UAV 302. In particular, the UAV 302 can apply a distance vector between the GPS receiver and the camera at the time of capture to the calculated UAV location at the time of capture to identify a camera position at the time of capture.

Furthermore, although not illustrated in relation to FIG. 3, the digital UAV position system can then utilize the camera position. For example, the UAV 302 can generate a three-dimensional representation of a site utilizing a digital aerial image and a camera position at the time the digital aerial image was captured. Similarly, the UAV 302 can utilize the digital aerial image and camera position (and/or a three-dimensional representation of the site) for navigation during a flight mission.

It will be appreciated that although FIG. 3 illustrates particular devices (e.g., the UAV 302, the flight control device 304, the server(s) 306, and/or the RTK correction data source 308) performing particular steps, in one or more embodiments, one or more of the steps of the method 300 may be performed by other devices. For example, in one or more embodiments, rather than calculating a UAV position and/or camera position utilizing the UAV 302, the digital UAV position system calculates a UAV position and/or camera position at the flight control device 304 (and/or at the server(s) 306). Thus, for instance, the UAV 302 can send a digital aerial image, a time of capture, and an attitude at the time of capture to the flight control device 304 (and/or the server(s) 306) and the flight control device 304 (and/or the server(s) 306) can perform the steps 332 and 340. Similarly, the flight control device 304 and/or the server(s) 306 can generate a three-dimensional representation of a site or generate navigation information based on the detected position of the UAV and the digital aerial image.

Furthermore, in one or more embodiments, the flight control device 304 and/or the UAV 302 can perform the step 320 of requesting RTK correction data. The flight control device 304 and/or the UAV 302 can also receive the RTK correction data from the RTK correction data source 308. Thus, for example, the flight control device 304 can connect to a remote server and obtain RTK correction data directly from the RTK correction data source 308 (and provide the RTK correction data to the UAV 302). Similarly, the RTK correction data source 308 can comprise a reference station at a mission plan site and the UAV 302 can request and receive RTK correction data directly from the reference station.

As mentioned previously, in one or more embodiments, the digital UAV position system calculates a position of a UAV at a time when a camera affixed to the UAV captures a digital aerial image. Specifically, the digital UAV position system can calculate a position of a UAV at a capture time based on positions of the UAV at a plurality of other times. For example, FIG. 4A illustrates identifying a position of a UAV at a capture time by interpolating between positions of the UAV at additional times. In particular, FIG. 4A illustrates the UAV 100 at a first position 404a at a first time 404, at a second position 406a at a second time 406, and at a capture position 402a at a capture time 402.

As mentioned above, in one or more embodiments, the digital UAV position system calculates a position of a UAV utilizing satellite signals and RTK correction data corresponding to particular instances of time (e.g., at a rate of 5 hertz). In most instances, the capture time (i.e., the time a camera affixed to the UAV captures a digital aerial image), does not correspond to these same particular instances of time. For example, the camera may capture a digital aerial image at the time 9:20:00.00, while the digital UAV position system has data reflecting the carrier signal from the UAV and/or RTK correction data from a reference station corresponding to the times 9:19:99.07 and 9:20:00.02. Accordingly, in one or more embodiments, the digital UAV position system interpolates to identify the position of the UAV at the capture time.

As shown in FIG. 4A, the digital UAV position system determines the first position 404a of the UAV 100 at the first time 404. Specifically, the digital UAV position system analyzes a carrier signal 404b and RTK correction data to calculate the first position 404a of the UAV 100 at the first time 404 based on the number of wave lengths between the UAV 100 and a satellite transmitting the carrier signal 404b. Similarly, the digital UAV position system analyzes a carrier signal 406b and corresponding RTK correction data to calculate the second position 406a of the UAV 100 at the second time 406. However, the digital UAV position system does not have a calculated position based on a carrier signal at the capture time 402. Accordingly, as shown, the digital UAV position system linearly interpolates between the the first time 404 at the first position 404a and the second time 406 at the second position 406a to calculate the position 402a at the capture time 402.

Figure 4B:
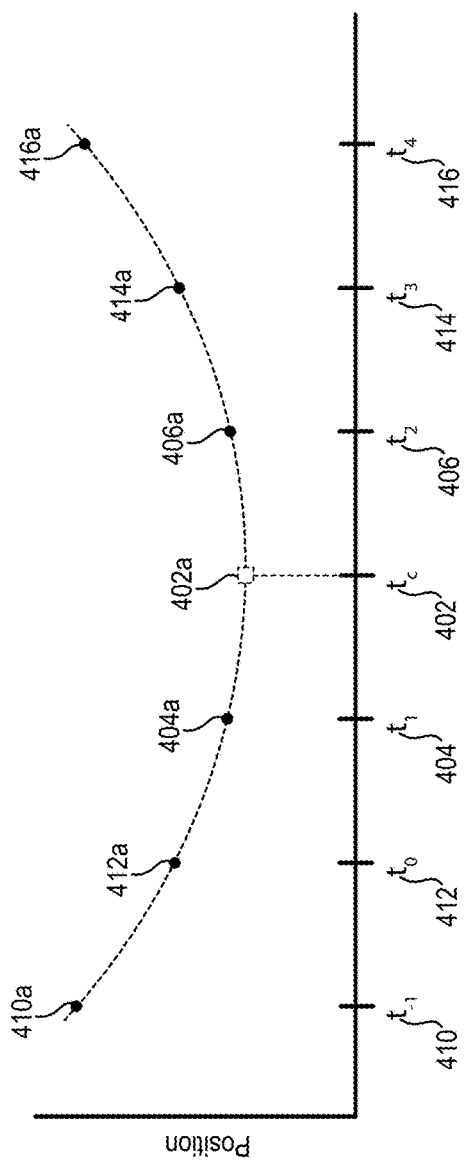
FIG. 4B illustrates another representation of calculating a position of a UAV at a time that a camera captures a digital aerial image in accordance with one or more embodiments.

Although FIG. 4A illustrates linearly interpolating between two calculated positions of a UAV, in one or more embodiments the digital UAV position system can utilize additional calculated positions and alternative interpolation methods to calculate a capture position of a UAV. For example, FIG. 4B illustrates utilizing a plurality of calculated positions 404a-416a at a corresponding plurality of times 404-416 based on non-linear interpolation to calculate a capture position 402a of the UAV 100 at the capture time 402. Specifically, FIG. 4B illustrates fitting a best-fit curve to the positions 404a-416a across the times 404-416. Moreover, FIG. 4B illustrates interpolating along the best-fit curve to the capture time 402 to identify the capture position 402a.

Although FIG. 4B illustrates a particular type of best-fit curve, the digital UAV position system can utilize any type of equation, curve, or line to interpolate a capture position. For example, the digital UAV position system can interpolate based on logarithmic, exponential, quadratic, or some other relationship to identify the capture position 402a.

It will be appreciated that although FIGS. 4A-4B illustrate a one-dimensional position (e.g., elevation) in a two-dimensional graph of position versus time, the digital UAV position system can calculate a three-dimensional position of a UAV at a capture time. Thus, for example, the digital UAV position system can generate an x, y, and z coordinate corresponding to the capture position 402a of the UAV 100 at the capture time 402.

As mentioned previously, in one or more embodiments, the position of a camera affixed to a UAV is different than the position of a GPS receiver of a UAV, and thus a calculated position of the UAV. Indeed as used herein, the term "position of the UAV" can refer to a position of any portion of the UAV. For example, the position of the UAV can comprise the position of a GPS receiver of the UAV, which is slightly different than the position of a camera affixed to the UAV.

Accordingly, utilizing a position of a UAV based on a GPS receiver can result in inaccurate camera position data. In one or more embodiments, the digital UAV position system accounts for the difference in position between the camera and other components of the UAV by detecting an attitude of the UAV (i.e., roll, pitch, and yaw of the UAV) at the time of capture and generating a distance vector.

Figure 4C:
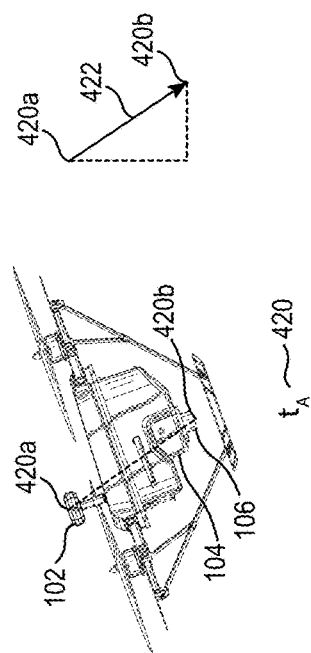
FIG. 4C illustrates a representation of measuring an attitude and calculating a distance vector corresponding to a receiver and a camera in accordance with one or more embodiments.

For example, FIG. 4C illustrates the UAV 100 at a capture position 420a corresponding to a capture time 420. At the capture time 420 the calculated capture position 420a corresponds to the location of the GPS receiver 102. The location of the camera 104 and the lens 106, however, is on the opposite side of the UAV 100. Accordingly, at the capture time 420, the digital UAV position system detects an attitude (roll, pitch, and yaw) of the UAV 100. Moreover, based on the attitude of the UAV 100, the digital UAV position system calculates a distance vector 422.

As shown, the distance vector 422 reflects a distance and from the GPS receiver 102 to the camera lens 106 at the capture time 420. Although illustrated in two dimensions, it will be appreciated that in one or more embodiments, the distance vector 422 is a three-dimensional vector. In relation to FIG. 4C, the digital UAV position system applies the distance vector 422 to the capture position 420a to calculate a camera capture position 420b.

Upon determining a position of the camera corresponding to the time the camera captured the digital aerial image, the digital UAV position system can utilize the digital aerial image and the position of the camera. For example, as shown in FIG. 5, the digital UAV position system can utilize digital aerial images of a site and known camera positions to generate a three-dimensional representation of the site. In particular, FIG. 5 illustrates a plurality of digital aerial images 502a-502n corresponding to camera positions 506a-506n. As shown, the digital UAV position system can utilize the digital aerial images 502a-502n and corresponding camera positions 506a-506n to generate a three-dimensional representation 510.

In particular, the digital UAV position system can utilize each camera position 506a-506n as a known anchor point in generating the three-dimensional representation 510. For example, in one or more embodiments, the digital UAV position system utilizes a structure from motion algorithm and a bundle adjustment algorithm to generate one or more three-dimensional representations. A structure from motion algorithm is a process of estimating three-dimensional structures form two-dimensional image sequences. In particular, a structure from motion algorithm determines matching features from a plurality of digital aerial images, tracks the matching features and variations, and calculates feature trajectories. Moreover, a structure from motion algorithm can utilize the feature trajectories to generate a three-dimensional representation.

A bundle adjustment is an algorithm that refines a visual reconstruction to produce jointly optimal three-dimensional structure and viewing parameters. In particular, a plurality of digital aerial images generally have variations in perspective, calibration, and optical characteristics. Moreover, digital aerial images are generally captured at different positions, angles, perspectives, illuminations, and so forth. The bundle adjustment algorithm optimally resolves such viewing parameters to generate a three-dimensional model. For example, in one or more embodiments, the digital UAV position system utilizes the Levenberg-Marquardt bundle adjustment method. Similarly, the digital UAV position system can utilize the gradient descent bundle adjustment method, the Newton-Rhapson bundle adjustment method, and/or the Gauss-Newton bundle adjustment method.

Having known anchor points enables a bundle adjustment algorithm to refine a three-dimensional representation in light of digital aerial images portraying common features. For example, having known ground control points portrayed in digital aerial images allows a bundle adjustment algorithm to refine a three-dimensional representation. However, the digital UAV position system provides anchor points (i.e., known camera positions) without ground control points on a site or portrayed in a digital aerial image. Accordingly, in one or more embodiments, the digital UAV position system allows users to avoid the time and expense of setting up, maintaining, and removing ground control points at a site.

Having known camera positions assists in constructing an accurate three-dimensional representation from a plurality of digital aerial images more quickly and with less computational resources. Accordingly, as shown in FIG. 5, the digital UAV position system can utilize the camera positions 506a-506n in conjunction with the digital aerial images 502a-502n to generate an accurate three-dimensional representation 510 in less time and with less computing power.

Furthermore, as discussed previously, the digital UAV position system can also utilize camera position data in relation to navigation of a UAV. For instance, the digital UAV position system can generate a three-dimensional model that identifies a position of a landing station or other location on a site and utilize the camera capture position to navigate to the landing station or other location. For example, FIG. 6 illustrates utilizing a camera position 610 to navigate the UAV 100 in relation to a site 600.

Figure 6:
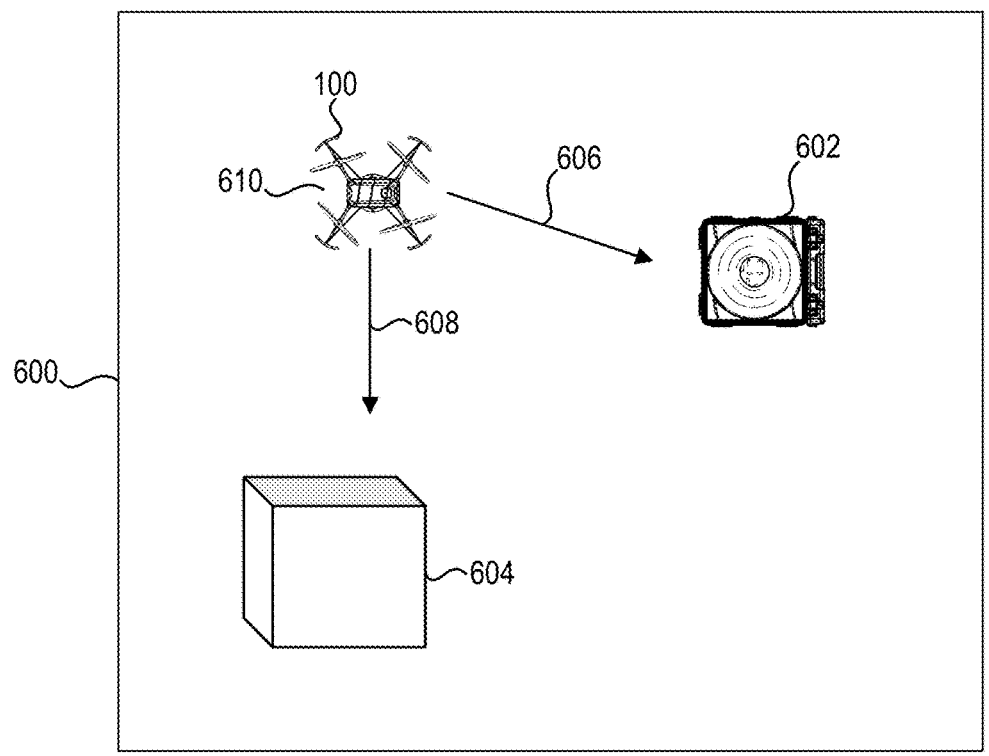
FIG. 6 illustrates a representation of navigating a UAV based on a determined position of the UAV in accordance with one or more embodiments.

Specifically, FIG. 6 illustrates a building 604 and a landing station 602 on the site 600 during a flight mission of the UAV 100. Utilizing the RTK techniques described above, the UAV 100 can identify the camera position 610 and utilize the camera position 610 in conjunction with a plurality of digital aerial images to generate a three-dimensional representation of the site 600. Utilizing the three-dimensional representation of the site, the UAV 100 can determine a position of the building 604 and a position of the landing station 602 in addition to the camera position 610. Moreover, the UAV 100 can alter navigation to traverse along the path 606 or the path 608 to travel from the camera position 610 to the position of the building 604 or the position of the landing station 602. In this manner, the digital UAV position system can enable a UAV to accurately navigate during a flight mission based on a precise position of a camera at a time a digital aerial image is captured.

Figure 7:
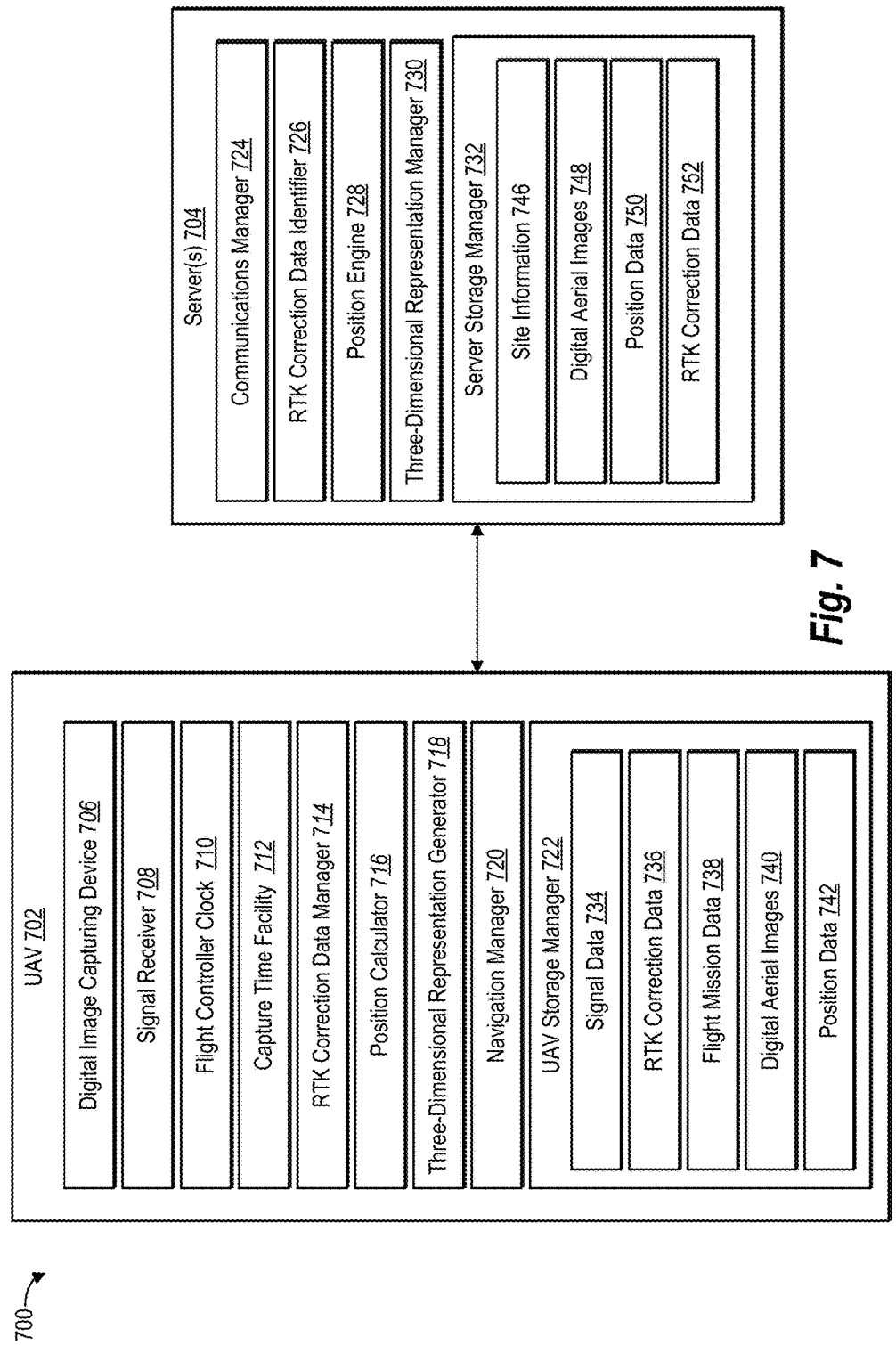
FIG. 7 illustrates a schematic diagram of a digital UAV position system in accordance with one or more embodiments.

Turning now to FIG. 7, additional detail will be provided regarding components and capabilities of one or more embodiments of the digital UAV position system. In particular, FIG. 7 shows a schematic diagram illustrating an example embodiment of a digital UAV position system 700 (e.g., the digital UAV position system discussed above). As shown in FIG. 1, in one or more embodiments, the digital UAV position system 700 includes a UAV 702 and server(s) 704. Moreover, as illustrated, the UAV 702 includes a digital image capturing device 706, a signal receiver 708, a flight controller clock 710, a capture time facility 712, an RTK correction data manager 714, a position calculator 716, a three-dimensional representation generator 718, a navigation manager 720 and a UAV storage manager 722 (comprising signal data 734, RTK correction data 736, flight mission data 738, digital aerial images 740, and position data 742). In addition, as shown, the server(s) 704 include a communications manager 724, an RTK correction data identifier 726, a position engine 728, a three-dimensional representation manager 730, and a server storage manager 732 (including location information 746, digital aerial images 748, position data 750, and RTK correction data 752).

As just mentioned, and as illustrated in FIG. 7, the UAV 702 includes the digital image capturing device 706, which represents one example embodiment of the camera 104. The digital image capturing device 706 can capture a digital aerial image. In particular, as discussed previously, the digital image capturing device 706 can capture a digital aerial image of a site during a flight mission of the UAV 702.

Moreover, as shown in FIG. 7, the UAV 702 includes the signal receiver 708, which represent one example embodiment of the GPS receiver 102. The signal receiver 708 can identify, receive, accept, collect, gather, and/or convert one or more signals transmitted by a satellite. In particular, as already discussed, the signal receiver 708 can receive a carrier signal transmitted by a satellite of a global navigation satellite system.

In addition, as illustrated in FIG. 7, the UAV 702 includes the flight controller clock 710. The flight controller clock 710 can set, identify, record, determine, synchronize, and/or identify one or more times. In particular, as discussed, the flight controller clock 710 can synchronize with a time signal transmitted by a satellite. Moreover, the flight controller clock 710 can utilize the synchronized time to identify a time that a digital aerial image was captured or a time corresponding to a position of the UAV 702.

As shown in FIG. 7, in addition to the flight controller clock 710, the UAV 702 also includes the capture time facility 712. The capture time facility 712 can detect a moment when a digital aerial image is captured. In particular, the capture time facility 712 can detect when the digital image capturing device 706 captures a digital aerial image based on when a shutter corresponding to the digital image capturing device 706 is open. As mentioned previously, the capture time facility 712 can include a light sensor (e.g., light diode) to detect a moment when a flash is activated by the digital image capturing device 706. Similarly, the capture time facility 712 can include one or more sensors to detect a signal sent by the camera to open a shutter. The capture time facility 712 can utilize the flight controller clock 710 to identify a time corresponding to the moment when the digital image capturing device 706 captures a digital aerial image.

As shown in FIG. 7, the UAV 702 also includes the RTK correction data manager 714. The RTK correction data manager 714 can receive, identify, and/or obtain RTK correction data. For example, the RTK correction data manager 714 can obtain RTK correction data from the server(s) 704 (e.g., via the communications manager 724 and/or the RTK correction data identifier 726). Similarly, the RTK correction data manager 714 can receive RTK correction data from one or more reference stations or third party servers.

As shown in FIG. 7, the UAV 702 also includes the position calculator 716. The position calculator 716 can determine, identify, calculate, and/or generate a position of the UAV 702, the signal receiver 708, and/or the digital image capturing device 706. For example, as discussed above, the position calculator 716 can analyze a signal from a satellite (e.g., from the signal receiver 708) in conjunction with RTK correction data (e.g., from the RTK correction data manager 714) and calculate a position of the UAV 702 and/or its components. In particular, the position calculator 716 can determine a position of the UAV 702 based on a number of wavelengths between the UAV 702 and a satellite.

The position calculator 716 can also determine a quality of a position calculation. For example, as described above, the position calculator 716 can determine whether a position calculation is based on a fixed integer number of wavelengths or a floating approach.

As illustrated in FIG. 7, the UAV 702 also includes the three-dimensional representation generator 718. The three-dimensional representation generator 718 can create, calculate, and/or generate one or more three-dimensional representations. In particular, as described above, the three-dimensional representation generator 718 can generate a three-dimensional representation based on a plurality of digital aerial images and corresponding positions of the digital image capturing device 706 at the times when the plurality of digital aerial images were captured.

Furthermore, as shown in FIG. 7, the UAV 702 also includes the navigation manager 720. The navigation manager 720 can guide, navigate, control and/or direct the UAV 702. In particular, the navigation manger 720 can control flight components (e.g., motors and rotors) of the UAV 702 to navigate the UAV 702. The navigation manager 720 can direct the UAV 702 based on position data 742 (e.g., data generated by the position calculator 716 and/or three-dimensional representations generated by the three-dimensional representation generator 718).

Moreover, as illustrated in FIG. 7, the UAV 702 also includes the UAV storage manager 722. The UAV storage manager 722 maintains data for the digital UAV position system 700. The UAV storage manager 722 can maintain data of any type, size, or kind, as necessary to perform the functions of the digital UAV position system 700, including signal data 734 (i.e., data regarding signals received from a satellite), RTK correction data 736, flight mission data 738 (i.e., data regarding a flight mission, such as location, flight legs, duration, etc.), digital aerial images 740, and position data 742 (e.g., positions of a UAV, attitude of a UAV, positions of a camera, or three-dimensional representations).

As mentioned, the digital UAV position system 700 also includes the server(s) 704, which represent one example embodiment of the server(s) 306. As shown in FIG. 7, the server(s) 704 include the communications manager 724. The communications manager 724 can send, receive, transfer, and communicate data in relation to the server(s) 704. For example, the communication manager 724 can receive information from the UAV 702 indicating that a flight mission is beginning, indicating a flight mission location, or other information regarding a flight mission (e.g., from the flight mission data 738). Similarly, the communication manager 724 can send a three-dimensional representation to the UAV 702.

As shown in FIG. 7, the server(s) 704 also include the RTK correction data identifier 726. The RTK correction identifier 726 can obtain, identify, determine, receive, and/or locate RTK correction data. For example, as already discussed, the RTK correction data identifier 726 can obtain RTK correction data from a reference station, a reference station network, or a third party server hosting RTK correction data.

Furthermore, as illustrated in FIG. 7, the server(s) 704 also include the position engine 728. Similar to the position calculator 716, the position engine 728 can determine, identify, calculate, and/or generate a position of the UAV 702. For example, the UAV 702 can transmit to the server(s) 704 (e.g., via the communication manager 724) information regarding a carrier signal (e.g., obtained by the signal receiver 708) and generate a position of the UAV based on the carrier signal and corresponding RTK correction data (e.g., via the RTK correction data identifier 726). In addition, the UAV 702 can transmit a capture time to the server(s) 704 (e.g., via the capture time facility 712), and the position engine 728 can generate a position of the UAV 702 and/or its components at the capture time.

As illustrated in FIG. 7, the server(s) 704 also include the three-dimensional representation manager 730. Similar to the the three-dimensional representation generator 718, the three-dimensional representation manager 730 can create, calculate, receive, manage, and/or generate one or more three-dimensional representations. For example, the three-dimensional representation manager 730 can generate a three-dimensional representation based on data received from the UAV 702 and/or receive a three-dimensional representation generated from the UAV 702.

Moreover, as illustrated in FIG. 7, the server(s) 704 also include the server storage manager 732. The server storage manager 732 maintains data for the digital UAV position system 700. The server storage manager 732 can maintain data of any type, size, or kind, as necessary to perform the functions of the digital UAV position system 700, including location information 746 (e.g., information regarding a location of a mission plan), digital aerial images 748, position data 750, and RTK correction data 752.

Each of the components 702-732 of the digital UAV position system 700 and their corresponding elements may be in communication with one another using any suitable communication technologies. It will be recognized that although components 702-732 are shown to be separate in FIG. 7, any of components 702-732 may be combined into fewer components (such as into a single component), divided into more components, or configured into different components as may serve a particular embodiment. Moreover, one or more embodiments of the digital UAV position system 700 may include additional components or fewer components than those illustrated in FIG. 7.

The components 702-732 and their corresponding elements can comprise software, hardware, or both. For example, the components 702-732 and their corresponding elements can comprise one or more instructions stored on a computer-readable storage medium and executable by processors of one or more computing devices. When executed by the one or more processors, the computer-executable instructions of the digital UAV position system 700 can cause one or more computing systems (e.g., one or more server devices) to perform the methods and provide the functionality described herein. Alternatively, the components 702-732 can comprise hardware, such as a special purpose processing device to perform a certain function or group of functions. Moreover, the components 702-732 can comprise a combination of computer-executable instructions and hardware.

Furthermore, the components 702-732 of the digital UAV position system 700 and their corresponding elements may, for example, be implemented as one or more stand-alone applications, as one or more modules of an application, as one or more plug-ins, as one or more library functions or functions that may be called by other applications, and/or as a cloud-computing model. Thus, components 702-732 of the digital UAV position system 700 and their corresponding elements may be implemented as one or more stand-alone applications, such as a desktop or mobile application. Furthermore, the components 702-732 of the digital UAV position system 700 may be implemented as one or more web-based applications hosted on a remote server. Moreover, the components of the digital UAV position system 700 may be implemented in a suite of mobile device applications or "apps."

Figure 8:
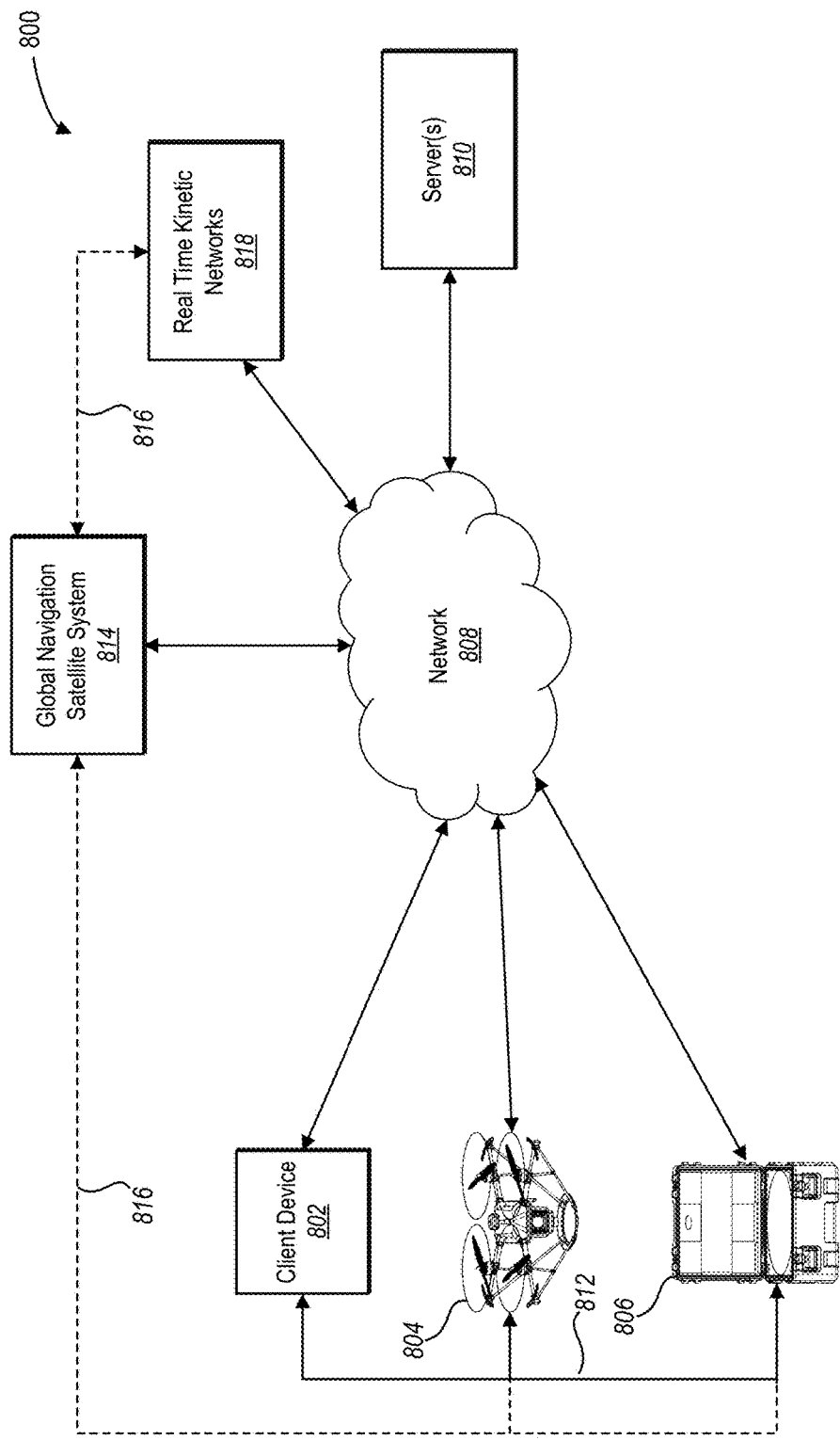
FIG. 8 illustrates a schematic diagram of a network environment in which the methods and systems disclosed herein may be implemented in accordance with one or more embodiments.

Turning now to FIG. 8, further information will be provided regarding implementation of the digital UAV position system 700. Specifically, FIG. 8 illustrates a schematic diagram of one embodiment of an exemplary system environment ("environment") 800 in which the digital UAV position system 700 can operate. As illustrated in FIG. 8, the environment 800 can include client devices(s) 802, a UAV 804, a reference station 806, a network 808, server(s) 810, a global navigation satellite system 814, and a real time kinematic network 818. The client device(s) 802, the UAV 804, the reference station 806, the network 808, the server(s) 810, the global navigation satellite system 814, and the real time kinematic network 818 may be communicatively coupled with each other either directly or indirectly (e.g., through network 808 and/or by transmitting and receiving signals 816 via a satellite). The client device(s) 802, the UAV 804, the reference station 806, the network 808, the server(s) 810, the global navigation satellite system 814, and the real time kinematic network 818 may communicate using any communication platforms and technologies suitable for transporting data and/or communication signals, including any known communication technologies, devices, media, and protocols supportive of remote data communications, examples of which will be described in more detail below with respect to FIG. 11.

As just mentioned, and as illustrated in FIG. 8, the environment 800 can include the client device(s) 802, which represent one example embodiment of the flight control device 304. The client device(s) 802 may comprise any type of computing device. For example, the client device(s) 802 may comprise one or more personal computers, laptop computers, mobile devices, mobile phones, tablets, special purpose computers, TVs, or other computing devices. In one or more embodiments, the client device(s) 802 may comprise computing devices capable of communicating with the UAV 804, the reference station 806, and/or the server(s) 810. More specifically, in one or more embodiments, a pilot may utilize the client device(s) 802 (e.g., the flight control device 304) to locally control and/or communicate with the UAV 804. The client device(s) 802 may comprise one or more computing devices as discussed in greater detail below with regard to FIG. 11.

Moreover, FIG. 8 also illustrates that the environment 800 can include the UAV 804, which represents one example embodiment of the UAV 100, the UAV 302, or the UAV 702. As described above, the UAV 804 can comprise any type of unmanned aerial vehicle. Moreover, the UAV 804 can include a camera capable of capturing digital aerial images, a flight controller clock, and/or a signal receiver. In particular, the UAV 804 can comprise a GPS receiver for receiving signals 816 from the global navigation satellite system 814.

As shown in FIG. 8, the environment 800 may include the reference station 806 which represents one example embodiment of the reference station 200 and/or the RTK correction data source 308). As discussed above, the reference station 806 can receive signals from a satellite, generate RTK correction data, and provide the RTK correction data for calculating position data. In one or more embodiments, the reference station may also comprise a docking station utilized to land, store, charge, guide, or repair the UAV 804. Moreover, the reference station 806 may be utilized to communicate with the UAV 804 prior to, during, or after a flight.

As illustrated in FIG. 8, the client device(s) 802, the UAV 804, the reference station 806, the server(s) 810, the global navigation satellite system 814, and/or the real time kinematic network 818 may communicate via the network 808. The network 808 may represent a network or collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the network 808 may be any suitable network over which the client device(s) 802 (or other components) may access the server(s) 810 or vice versa. The network 808 will be discussed in more detail below with regard to FIG. 11.

Moreover, as illustrated in FIG. 8, the environment 800 also includes the server(s) 810. The server(s) 810 may generate, store, receive, and/or transmit any type of data, including signal data 734, RTK correction data 736, flight mission data 738, digital aerial images 740, position data 742, location information 746, digital aerial images 748, position data 750, and/or RTK correction data 752. For example, the server(s) 810 can receive data from the client device(s) 802 and send the data to the UAV 804, and/or the reference station 806. In one example embodiment, the server(s) 810 comprise a data server. The server(s) 810 can also comprise a communication server or a web-hosting server. Additional details regarding the server(s) 810 will be discussed below with respect to FIG. 11.

As shown in FIG. 8, the environment 800 also includes the global navigation satellite system 814. The global navigation satellite system 814 can comprises a plurality of satellites, such as the satellites 204, 206, orbiting the Earth and transmitting signals. In particular, the global navigation satellite system 814 comprises a plurality of orbital satellites transmitting the signals 816 (e.g., carrier signals) comprising navigation information, including pseudorandom noise codes, time, and/or ephemerides.

Moreover, as illustrated in FIG. 8, the environment 800 also includes the real time kinematic network 818 which represents one example embodiment of the RTK correction data source 308. The real time kinematic network 818 comprises a plurality of reference stations operable to receive signals transmitted by orbital satellites. For example, the real time kinematic network 818 can receive signals 816 from the global navigation satellite system 814. As mentioned, the real time kinematic network 818 can collect information regarding the signals 816 and generate RTK correction data corresponding to a particular location (e.g., the location of a flight mission of the UAV 804).

Although FIG. 8 illustrates client device(s) 802, the single UAV 804, and the single reference station 806, it will be appreciated that the client device(s) 802, the UAV 804, and the reference station 806 can represent any number of computing devices, UAVs, or reference stations (fewer or greater than shown). Similarly, although FIG. 8 illustrates a particular arrangement of the client device(s) 802, the UAV 804, the reference station 806, the network 808, the server(s) 810, the global navigation satellite system 814, and the real time kinematic network 818, various additional arrangements are possible.

For example, the client device(s) 802, the UAV 804 and/or the reference station 806 may communicate directly one with another via a local connection 812. The local connection 812 may comprise any recognized form of wired or wireless communication. For example, in one or more embodiments the client device 802 may include a mobile computing device (e.g., tablet) utilized by a UAV operator to communicate with the UAV 804 and the reference station 806 using BLUETOOTH technology.

By way of an additional example, in one or more embodiments, the UAV 804 begins a mission plan at a site and the client device(s) 802 transmit an indication to the server(s) 810 that the UAV 804 has begun the mission plan at the site. The server(s) 810 obtain RTK correction data (via the RTK correction data identifier 726) corresponding to the location of the site from the real time kinematic network 818. Moreover, the server(s) 810 provide the RTK correction data (based on the carrier signal 816) to the client device(s) 802 (e.g., via the communication manager 724). The client device(s) 802 receiver the RTK correction data (e.g., via the RTK correction data manager 714). Moreover, the UAV 804 receives the carrier signal 816 from the global navigation satellite system 814 (e.g., via the signal receiver 708) and transmits the carrier signal 816 to the client device(s) 802. The client device(s) 802 utilize the carrier signal 816 detected by the UAV 804 and the RTK correction data generated by the real time kinematic network 818 and calculates positions of the UAV 804 (e.g., via the position calculator 716). The UAV 804 also captures digital aerial images of the site during the flight mission (e.g., via the digital image capturing device 706). The UAV 804 detects times of capture (by detecting precisely when a shutter of a camera affixed to the UAV is open) and also detects attitudes of the UAV 804 at the time of capture (e.g., via the capture time facility 712 and the position calculator 716). The UAV 804 provides the digital aerial images, the times of capture, and the detected attitudes of the UAV 804 to the client device(s) 802. The client device(s) 802 utilize the calculated positions of the UAV, the times of capture, and the detected attitudes of the UAV 804 to determine camera positions at the times of capture (e.g., via the position calculator 716). Moreover, the client device(s) 802 utilize the camera positions and the digital aerial images to generate a three-dimensional representation of the site (e.g., via the three-dimensional representation generator 718). Furthermore, the client device(s) 802 utilize the three-dimensional representation of the site to navigate the UAV 804 (e.g., via the navigation manager 720).

As illustrated by the previous example embodiments, the digital UAV position system 700 may be implemented in whole, or in part, by the individual elements 802-810 of the environment 800. Although the previous examples describe certain components of the digital UAV position system 700 implemented with regard to certain components of the environment 800, it will be appreciated that components of the digital UAV position system 700 can be implemented in any of the components of the environment 800. For example, the digital UAV position system 700 may be implemented entirely on the UAV 804. Similarly, the digital UAV position system 700 may be implemented on the client device(s) 802, the reference station 806, and/or the server(s) 810. Moreover, different components and functions of the digital UAV position system 700 may be implemented separately among the client device(s) 802, the UAV 804, the reference station 806, the network 808, and the server(s) 810.

Figure 9:
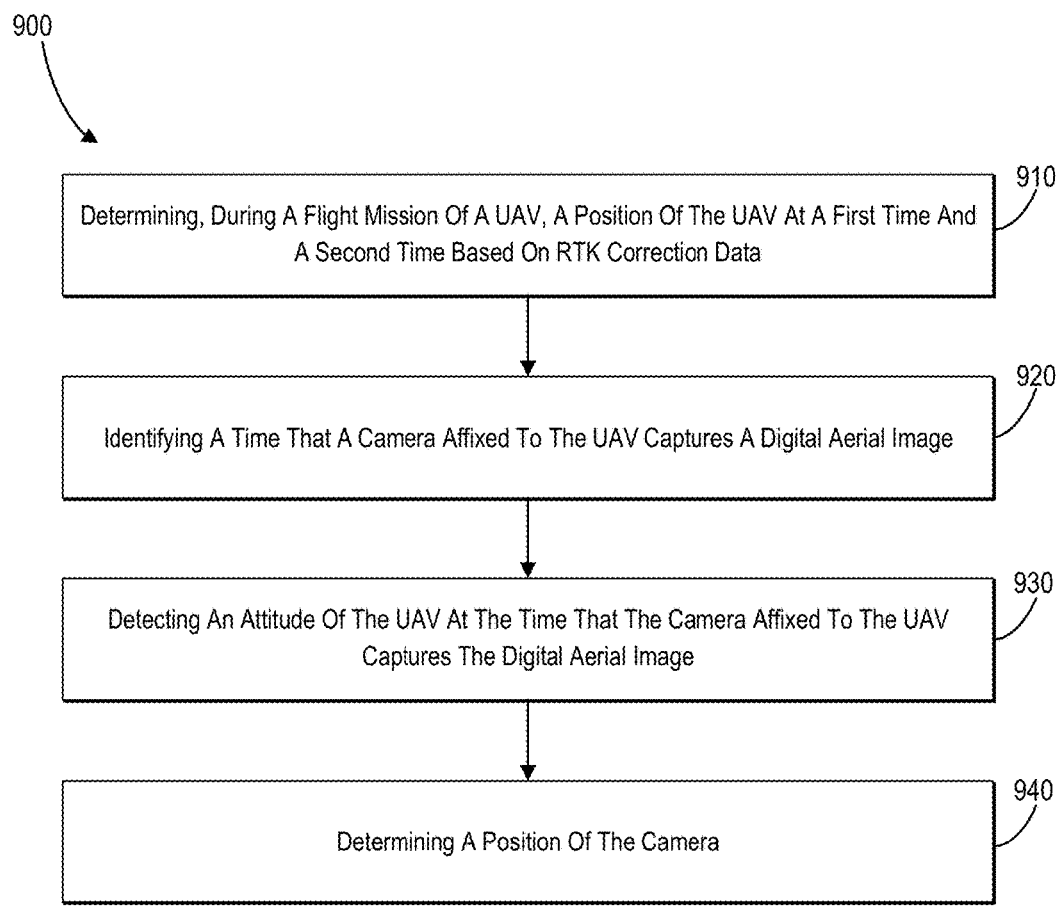
FIG. 9 illustrates a flowchart of a series of acts in a method of determining a position of a camera at a time of capturing a digital aerial image in accordance with one or more embodiments.

FIGS. 1-8, the corresponding text, and the examples, provide a number of different systems and devices for managing energy with regard to determining a position of a camera affixed to a UAV at a time of capturing digital aerial images. In addition to the foregoing, one or more embodiments can also be described in terms of flowcharts comprising acts and steps in a method for accomplishing a particular result. For example, FIG. 9 illustrates flowcharts of exemplary methods in accordance with one or more embodiments. The methods described in relation to FIG. 9 may be performed with less or more steps/acts or the steps/acts may be performed in differing orders. Additionally, the steps/acts described herein may be repeated or performed in parallel with one another or in parallel with different instances of the same or similar steps/acts.

FIG. 9 illustrates a flowchart of one example method 900 of determining a position of a camera affixed to a UAV at a time of capturing a digital aerial image in accordance with one or more embodiments. As illustrated, the method 900 includes an act 910 of determining, during a flight mission of a UAV, a position of the UAV at a first time and a second time based on RTK correction data. In particular, the act 910 can include determining, by at least one processor during a flight mission of a UAV, a position of the UAV at a first time and a position of the UAV at a second time based on a number of wave lengths of a signal transmitted from a satellite to the UAV at the first time, a number of wave lengths of the signal at the second time, RTK correction data at the first time, and RTK correction data at the second time.

For example, in one or more embodiments, the act 910 includes receiving, during the flight mission, a feed of RTK correction data generated by at least one of an RTK network comprising a plurality of reference stations or a reference station at the site corresponding to the flight mission. In particular, the act 910 can include sending an indication in relation to beginning the flight mission; and in response to sending the indication, receiving the feed of RTK correction data by the UAV during the flight mission, the feed of RTK correction data comprising the RTK correction data at the first time and the RTK correction data at the second time.

Moreover, in one or more embodiments of the method 900, the UAV comprises a single frequency GPS receiver. In addition, the act 910 can include fixing the number of full wavelengths between the GPS receiver and the satellite.

As illustrated in FIG. 9, the method 900 also includes the act 920 of identifying a time that a camera affixed to the UAV captures a digital aerial image. In particular, the method 900 can include identifying, by the at least one processor during the flight mission, a time that a camera affixed to the UAV captures a digital aerial image of a site by detecting when a shutter of the camera affixed to the UAV is open. For example, in one or more embodiments, the act 920 includes detecting, by a light sensor, a flash generated by the camera when the camera shutter is open. In addition, in one or more embodiments, the act 920 includes detecting a signal generated by the camera, wherein the signal triggers the shutter to open.

As shown in FIG. 9, the method 900 also includes the act 930 of detecting an attitude of the UAV at the time that the camera affixed to the UAV captures the digital aerial image. In particular, the method 900 can include detecting an attitude of the UAV at the time that the camera affixed to the UAV captures the digital aerial image, wherein the attitude comprises a measurement of pitch, roll, and yaw of the UAV corresponding to the time that the UAV captures the digital aerial image.

In addition, as shown in FIG. 9, the method 900 includes the act 940 determining a position of the camera. In particular, the act 940 can include determining, by the at least one processor, a position of the camera based on the time of capturing the digital aerial image, the attitude of the UAV at the time that the camera affixed to the UAV captures the digital aerial image, the position of the UAV at the first time, and the position of the UAV at the second time.

Moreover, in one or more embodiments, the method 900 also includes modifying navigation of the UAV based on the position of the camera at the time of capturing the digital aerial image. The method 900 can also include generating a three-dimensional representation of the site based in part on the digital aerial image of the site and the position of the camera at the time of capturing the digital aerial image. In one or more embodiments, the method 900 includes determining the position of the UAV at the time of capturing the digital aerial image by interpolating between the position of the UAV at the first time and the position of the UAV at the second time.

In addition, in one or more embodiments, the method 900 also includes synchronizing the flight controller clock of the UAV with a GPS satellite using a time transmission received from a satellite during the flight mission of the UAV; detecting the first time, the second time, and the time that the camera affixed to the UAV captures the digital aerial image utilizing the flight controller clock; and synchronizing the RTK correction data at the first time and the RTK correction data at the second time utilizing the flight controller clock.

Furthermore, in one or more embodiments of the method 900, the position of the UAV comprises a position of a GPS receiver affixed to the UAV. Moreover, in one or more embodiments, determining the position of the camera comprises generating a distance vector from the position of the GPS receiver and the camera based on the detected attitude of the UAV at the time that the camera affixed to the UAV captures the digital image; and applying the distance vector to the position of the GPS receiver at the time of capturing the digital aerial image.

In one or more embodiments, the method 900 also includes determining, by the at least one processor during the flight mission, a quality of a calculation of the position of the UAV at a third time, wherein determining the quality of the calculation comprises determining whether the calculation is fixed or floating; and modifying flight of the UAV based on the determination of the quality of the calculation.

Figure 10:
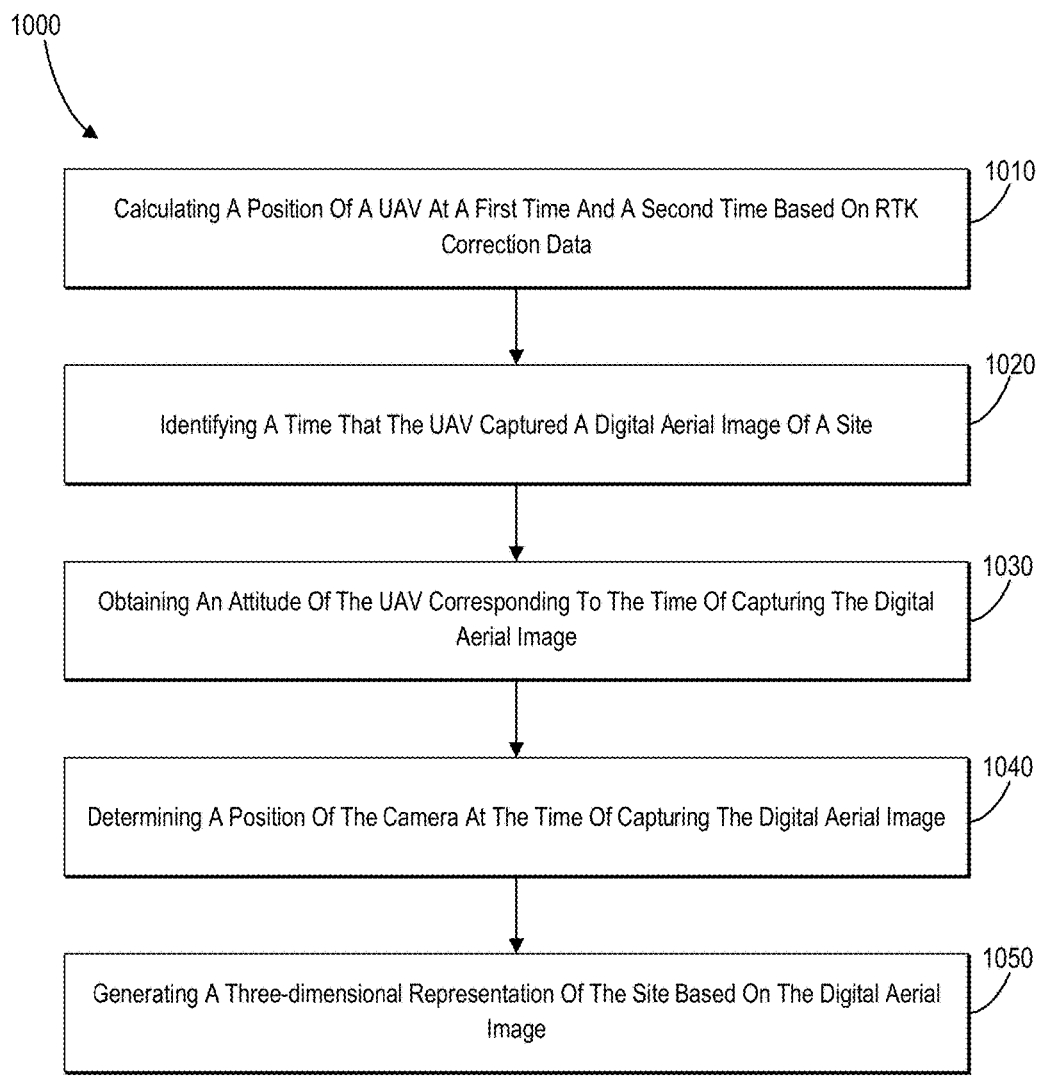
FIG. 10 illustrates another flowchart of a series of acts in a method of determining a position of a camera at a time of capturing a digital aerial image in accordance with one or more embodiments.

FIG. 10 illustrates another flowchart of another example method 1000 of determining a position of a camera affixed to a UAV at a time of capturing a digital aerial image in accordance with one or more embodiments. As illustrated, the method 1000 includes an act 1010 of calculating a position of a UAV at a first time and a second time based on RTK correction data. In particular, the act 1010 can include calculating, by at least one processor, a position of a UAV at a first time and a position of the UAV at a second time based on a signal transmitted from a satellite to the UAV at the first time, a signal at the second time, RTK correction data at the first time, and RTK correction data at the second time. For example, in one or more embodiments, the act 1010 comprises obtaining RTK correction data from at least one of a third-party server or a reference station at the site.

As illustrated in FIG. 10, the method 1000 includes an act 1020 of identifying a time that the UAV captured a digital aerial image of a site. In particular, the act 1020 can include identifying, by the at least one processor, a time that the UAV captured a digital aerial image of a site based on a measurement by the UAV of when a shutter of a camera affixed to the UAV was open.

As shown in FIG. 10, the method 1000 also includes an act 1030 of obtaining an attitude of the UAV corresponding to the time of capturing the digital aerial image. In particular, the act 1030 can include obtaining an attitude of the UAV corresponding to the time that the UAV captured the digital aerial image, wherein the attitude data comprises a measurement of pitch, roll, and yaw of the UAV corresponding to the time that the UAV captured the digital aerial image In addition, as illustrated in FIG. 10, the method 1000 also includes the act 1040 of determining a position of the camera at the time of capturing the digital aerial image. In particular, the act 1040 can include determining a position of the camera at the time of capturing the digital aerial image based on the attitude of the UAV at the time of capturing the digital aerial image, the position of the UAV at the first time, and the position of the UAV at the second time. For example, in one or more embodiments, the act 1040 includes generating a distance vector from the position of the GPS receiver and the camera based on the detected attitude of the UAV at the time that the camera affixed to the UAV captures the digital image; and applying the distance vector to the position of the GPS receiver at the time of capturing the digital aerial image.

As illustrated in FIG. 10, the method 1000 also includes the act 1050 of generating a three-dimensional representation of the site based on the digital aerial image. In particular, the act 1050 can include generating a three-dimensional representation of the site based on the digital aerial image and the determined position of the camera at the time of capturing the digital aerial image.

Moreover, in one or more embodiments of the method 900, the digital aerial image of the site lacks ground control points. Further, the method 900 further includes generating the three-dimensional representation of the site without using ground control points.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
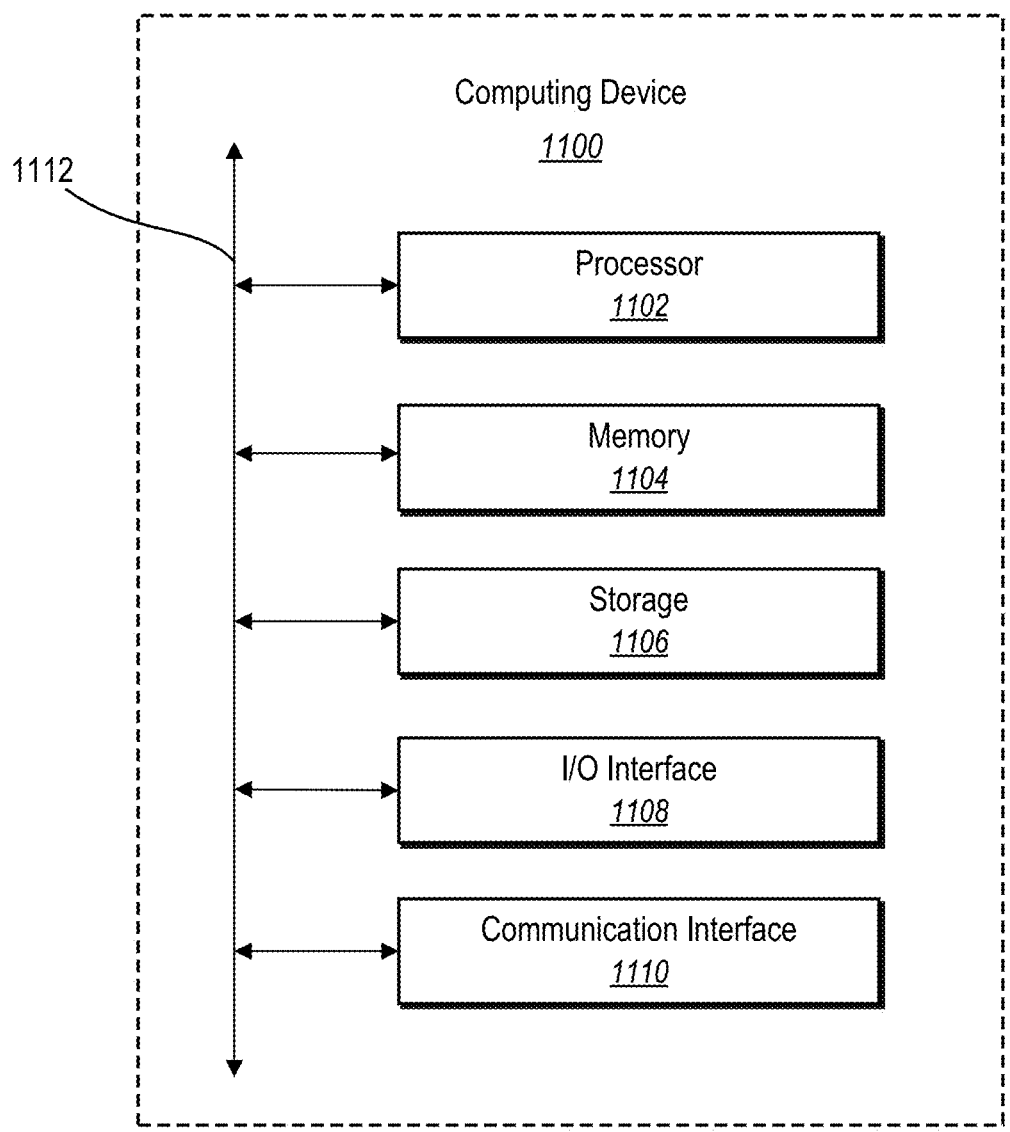
FIG. 11 illustrates a block diagram of an exemplary computing device in accordance with one or more embodiments.

FIG. 11 illustrates a block diagram of an exemplary computing device 1100 that may be configured to perform one or more of the processes described above. One will appreciate that the digital UAV position system 1100 may be implemented by one or more computing devices such as the computing device 1100. As shown by FIG. 11, the computing device 1100 can comprise a processor 1102, memory 1104, a storage device 1106, an I/O interface 1108, and a communication interface 1110, which may be communicatively coupled by way of a communication infrastructure 1112. While an exemplary computing device 1100 is shown in FIG. 11, the components illustrated in FIG. 11 are not intended to be limiting. Additional or alternative components may be used in other embodiments. Furthermore, in certain embodiments, the computing device 1100 can include fewer components than those shown in FIG. 11. Components of the computing device 1100 shown in FIG. 11 will now be described in additional detail.

In particular embodiments, the processor 1102 includes hardware for executing instructions, such as those making up a computer program. As an example and not by way of limitation, to execute instructions, the processor 1102 may retrieve (or fetch) the instructions from an internal register, an internal cache, the memory 1104, or the storage device 1106 and decode and execute them. In particular embodiments, the processor 1102 may include one or more internal caches for data, instructions, or addresses. As an example and not by way of limitation, the processor 1102 may include one or more instruction caches, one or more data caches, and one or more translation lookaside buffers (TLBs). Instructions in the instruction caches may be copies of instructions in the memory 1104 or the storage 1106.

The memory 1104 may be used for storing data, metadata, and programs for execution by the processor(s). The memory 1104 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1104 may be internal or distributed memory.

The storage device 1106 includes storage for storing data or instructions. As an example and not by way of limitation, the storage device 1106 can comprise a non-transitory storage medium described above. The storage device 1106 may include a hard disk drive (HDD), a floppy disk drive, flash memory, an optical disc, a magneto-optical disc, magnetic tape, or a Universal Serial Bus (USB) drive or a combination of two or more of these. The storage device 1106 may include removable or non-removable (or fixed) media, where appropriate. The storage device 1106 may be internal or external to the computing device 1100. In particular embodiments, the storage device 1106 is non-volatile, solid-state memory. In other embodiments, the storage device 1106 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 1108 allows a user to provide input to, receive output from, and otherwise transfer data to and receive data from the computing device 1100. The I/O interface 1108 may include a mouse, a keypad or a keyboard, a touch screen, a camera, an optical scanner, network interface, modem, other known I/O devices or a combination of such I/O interfaces. The I/O interface 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1108 is configured to provide graphical data to a display for presentation to a user. The graphical data may be representative of one or more graphical user interfaces and/or any other graphical content as may serve a particular implementation.

The communication interface 1110 can include hardware, software, or both. In any event, the communication interface 1110 can provide one or more interfaces for communication (such as, for example, packet-based communication) between the computing device 1100 and one or more other computing devices or networks. As an example and not by way of limitation, the communication interface 1110 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 1110 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 1110 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 1110 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 1112 may include hardware, software, or both that couples components of the computing device 1100 to each other. As an example and not by way of limitation, the communication infrastructure 1112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

We claim:

1. A method comprising:
   determining, by at least one processor during a flight mission of a UAV, a position of the UAV at a first time and a position of the UAV at a second time based on a number of wave lengths of a signal transmitted from a satellite to the UAV at the first time, a number of wave lengths of the signal at the second time, RTK correction data at the first time, and RTK correction data at the second time;
   identifying, by the at least one processor during the flight mission, a time that a camera affixed to the UAV captures a digital aerial image of a site by detecting when a shutter of the camera affixed to the UAV is open;
   detecting an attitude of the UAV at the time that the camera affixed to the UAV captures the digital aerial image, wherein the attitude comprises a measurement of pitch, roll, and yaw of the UAV corresponding to the time that the camera affixed to the UAV captures the digital aerial image; and determining, by the at least one processor, a position of the camera based on a time of capturing the digital aerial image, the attitude of the UAV at the time that the camera affixed to the UAV captures the digital aerial image, the position of the UAV at the first time, and the position of the UAV at the second time;

determining, by the at least one processor during the flight mission, a quality of a calculation of the position of the UAV at a third time, wherein determining the quality of the calculation comprises determining whether the calculation is fixed or floating; and modifying flight of the UAV based on the determination of the quality of the calculation.

2. The method of claim 1, further comprising modifying navigation of the UAV based on the position of the camera at the time of capturing the digital aerial image.

3. The method of claim 1, further comprising generating a three-dimensional representation of the site based in part on the digital aerial image of the site and the position of the camera at the time of capturing the digital aerial image.

4. The method of claim 1 further comprising determining the position of the UAV at the time of capturing the digital aerial image by interpolating between the position of the UAV at the first time and the position of the UAV at the second time.

5. The method of claim 1, wherein the position of the UAV comprises a position of a GPS receiver affixed to the UAV and determining the position of the camera comprises:

generating a distance vector from the position of the GPS receiver and the camera based on the detected attitude of the UAV at the time that the camera affixed to the UAV captures the digital aerial image; and applying the distance vector to the position of the GPS receiver at the time of capturing the digital aerial image.

6. The method of claim 1, further comprising:
synchronizing a flight controller clock of the UAV with a GPS satellite using a time transmission received from one or more satellites during the flight mission of the UAV;

detecting the first time, the second time, and the time that the camera affixed to the UAV captures the digital aerial image utilizing the flight controller clock; and synchronizing the RTK correction data at the first time and the RTK correction data at the second time utilizing the flight controller clock.

7. The method of claim 1, wherein detecting the time that the camera affixed to the UAV captures the digital aerial image further comprises detecting, by a light sensor, a flash generated by the camera when the camera shutter is open.

8. The method of claim 1, wherein determining the position of the UAV at the first time comprises receiving, during the flight mission, a feed of RTK correction data generated by at least one of an RTK network comprising a plurality of reference stations or a reference station at the site corresponding to the flight mission.

9. The method of claim 8, further comprising:
sending an indication in relation to beginning the flight mission; and in response to sending the indication, receiving the feed of RTK correction data by the UAV during the flight mission, the feed of RTK correction data comprising the RTK correction data at the first time and the RTK correction data at the second time.

10. The method of claim 1, wherein detecting when the shutter of the camera affixed to the UAV is open comprises measuring a signal from output pins within the camera indicating that the shutter is open.

11. A method comprising:
calculating, by at least one processor, a position of a UAV at a first time and a position of the UAV at a second time based on a signal transmitted from a satellite to the UAV at the first time, a signal at the second time, RTK correction data at the first time, and RTK correction data at the second time;

identifying, by the at least one processor, a time that the UAV captured a digital aerial image of a site based on a measurement by the UAV of when a shutter of a camera affixed to the UAV was open;

obtaining an attitude of the UAV corresponding to the time that the UAV captured the digital aerial image, wherein the attitude comprises a measurement of pitch, roll, and yaw of the UAV corresponding to the time that the UAV captured the digital aerial image;

determining a position of the camera at a time of capturing the digital aerial image based on the attitude of the UAV at the time of capturing the digital aerial image, the position of the UAV at the first time, and the position of the UAV at the second time by:

generating a distance vector from a position of a GPS receiver to the camera based on the attitude of the UAV at the time that the camera affixed to the UAV captures the digital aerial image; and applying the distance vector to the position of the GPS receiver at the time of capturing the digital aerial image; and generating a three-dimensional representation of the site based on the digital aerial image and the determined position of the camera at the time of capturing the digital aerial image.

12. The method of claim 11, wherein the digital aerial image of the site lacks ground control points, the method further comprising generating the three-dimensional representation of the site without using ground control points.

13. The method of claim 11, further comprising obtaining RTK correction data from at least one of a third-party server or a reference station at the site.

14. The method of claim 11, further comprising:
determining a quality of a calculation of the position of the UAV at a third time, wherein determining the quality of the calculation comprises determining whether the calculation is fixed or floating; and modifying flight of the UAV based on the determination of the quality of the calculation.

15. A system comprising:
a UAV with a camera affixed to the UAV;
at least one processor; and
at least one non-transitory computer readable storage medium storing instructions thereon that, when executed by the at least one processor, cause the system to:

determine, during a flight mission of the UAV, a position of the UAV at a first time and a position of the UAV at a second time based on a number of wave lengths of a signal transmitted from a satellite to the UAV at the first time, a number of wave lengths of the signal at the second time, RTK correction data at the first time, and RTK correction data at the second time;

identify, during the flight mission, a time that the camera affixed to the UAV captures a digital aerial image of a site by detecting when a shutter of the camera affixed to the UAV is open;

detect an attitude of the UAV at the time that the camera affixed to the UAV captures the digital aerial image, wherein the attitude comprises a measurement of pitch, roll, and yaw of the UAV corresponding to the time that the UAV captures the digital aerial image; and determine a position of the camera based on a time of capturing the digital aerial image, the attitude of the UAV at the time that the camera affixed to the UAV captures the digital aerial image, the position of the UAV at the first time, and the position of the UAV at the second time by:

generating a distance vector from a position of a GPS receiver and the camera based on the detected attitude of the UAV at the time that the camera affixed to the UAV captures the digital aerial image; and applying the distance vector to the position of the GPS receiver at the time of capturing the digital aerial image.

16. The system of claim 15, further comprising instructions that, when executed by the at least one processor, cause the system to: generate a three-dimensional representation of the site based in part on the digital aerial image of the site and the position of the camera at the time of capturing the digital aerial image.

17. The system of claim 15, wherein identifying the time that the camera affixed to the UAV captures the digital aerial image further comprises detecting a signal generated by the camera, wherein the signal triggers the shutter to open.

18. The system of claim 15, wherein the UAV comprises a single frequency GPS receiver and determining the position of the UAV comprises: fixing a number of full wavelengths between the GPS receiver and the satellite.

19. The system of claim 15, wherein the position of the UAV comprises a position of the GPS receiver affixed to the UAV and further comprising instructions that, when executed by the at least one processor, cause the system to:

determine the position of the GPS receiver at the time of capturing the digital aerial image by interpolating between the position of the GPS receiver at the first time and the position of the GPS receiver at the second time.

20. The system of claim 15, further comprising instructions that, when executed by the at least one processor, cause the system to:

determine, during the flight mission, a quality of a calculation of the position of the UAV at a third time, wherein determining the quality of the calculation comprises determining whether the calculation is fixed or floating; and modify flight of the UAV based on the determination of the quality of the calculation.

\* \* \* \* \*